US010350976B2

(12) United States Patent
Moriyama

(10) Patent No.: US 10,350,976 B2
(45) Date of Patent: Jul. 16, 2019

(54) DOOR STRUCTURE OF AUTOMOTIVE VEHICLE AND ASSEMBLY METHOD OF THE SAME

(71) Applicant: MAZDA MOTOR CORPORATION, Hiroshima (JP)

(72) Inventor: Yukihiro Moriyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 121 days.

(21) Appl. No.: 15/429,553

(22) Filed: Feb. 10, 2017

(65) Prior Publication Data
US 2017/0240031 A1   Aug. 24, 2017

(30) Foreign Application Priority Data
Feb. 19, 2016  (JP) ................................ 2016-030103

(51) Int. Cl.
*B60J 5/04* (2006.01)
*E05F 11/38* (2006.01)
*E05F 15/689* (2015.01)

(52) U.S. Cl.
CPC ........... *B60J 5/0466* (2013.01); *B60J 5/0412* (2013.01); *B60J 5/0416* (2013.01); *B60J 5/0425* (2013.01); *B60J 5/0426* (2013.01); *B60J 5/0427* (2013.01); *B60J 5/0431* (2013.01); *B60J 5/0434* (2013.01); *B60J 5/0468* (2013.01); *B60J 5/0483* (2013.01); *E05F 11/382* (2013.01);
(Continued)

(58) Field of Classification Search
CPC ...... B60J 5/0412; B60J 5/0413; B60J 5/0419; B60J 5/0425; B60J 5/0426; B60J 5/0468; B60J 5/0483
See application file for complete search history.

(56) References Cited

U.S. PATENT DOCUMENTS 4,658,546 A * 4/1987 Moriyama ............ E05F 11/382
                                                  49/227
4,866,883 A * 9/1989 Brown ................... B60J 5/0416
                                                  49/502
(Continued)

FOREIGN PATENT DOCUMENTS

JP     S61-146990 A    7/1986
JP     H10-37592 A     2/1998
(Continued)

OTHER PUBLICATIONS

An Office Action; "Notification of Reasons for Refusal," mailed by the Japanese Patent Office dated Jan. 9, 2018, which corresponds to Japanese Patent Application No. 2016-030103 and is related to U.S. Appl. No. 15/429,533; with English Translation.

*Primary Examiner* — Catherine A Kelly
(74) *Attorney, Agent, or Firm* — Studebaker & Brackett PC

(57) ABSTRACT

Guide rails with which a window regulator is provided are respectively fixed to a module plate. The guide rails are fixed, together with the module plate, to an edge of an opening portion provided at inward frames from an outward side in a vehicle width direction. Attachment portions which are capable of afterward attaching outward frames to the inward frames are provided, and attachment portions which are capable of afterward attaching a door outer panel to a door frame comprising the inward frames and the outward frames are provided.

5 Claims, 15 Drawing Sheets

(52) U.S. Cl.
CPC ......... *E05F 15/689* (2015.01); *E05Y 2600/46* (2013.01); *E05Y 2600/626* (2013.01); *E05Y 2900/531* (2013.01); *E05Y 2900/55* (2013.01)

(56) References Cited

U.S. PATENT DOCUMENTS

| | | | | |
|---|---|---|---|---|
| 4,974,365 A * | 12/1990 | Ono | ............................ | B60J 1/14 |
| | | | | 49/348 |
| 5,070,648 A * | 12/1991 | Moriyama | ............ | E05F 11/385 |
| | | | | 49/227 |
| 5,505,024 A * | 4/1996 | DeRees | ................. | B60J 5/0412 |
| | | | | 296/146.2 |
| 5,855,094 A * | 1/1999 | Baudisch | ............... | B60J 5/0412 |
| | | | | 49/348 |
| 6,378,251 B2 * | 4/2002 | Fukumoto | ............. | B60J 5/0412 |
| | | | | 49/503 |
| 6,571,515 B1 * | 6/2003 | Samways | ............... | B60J 5/0416 |
| | | | | 49/352 |
| 7,231,717 B2 * | 6/2007 | Wurm | .................... | B60J 5/0405 |
| | | | | 29/458 |
| 8,910,999 B2 * | 12/2014 | Schurter | ................ | B60J 5/0415 |
| | | | | 296/146.5 |
| 8,935,886 B2 * | 1/2015 | Pavlovic | ............... | E05F 11/483 |
| | | | | 49/349 |
| 9,950,595 B2 * | 4/2018 | Hofer | .................... | B60J 5/0426 |
| 2002/0162208 A1 * | 11/2002 | Wurm | ................... | B60J 5/0405 |
| | | | | 29/430 |
| 2007/0222257 A1 * | 9/2007 | Flendrig | ............... | B60J 5/0405 |
| | | | | 296/146.6 |
| 2017/0036521 A1 * | 2/2017 | Ogawa | ................... | B60J 5/0456 |
| 2017/0080525 A1 * | 3/2017 | Noda | ..................... | B23K 26/28 |
| 2017/0240029 A1 * | 8/2017 | Moriyama | ............... | B60J 5/042 |
| 2018/0056760 A1 * | 3/2018 | Hummer | ............... | B60J 5/0416 |

FOREIGN PATENT DOCUMENTS

| | | |
|---|---|---|
| JP | 2001-513043 A | 8/2001 |
| JP | 2001-246934 A | 9/2001 |
| JP | 2006-076440 A | 3/2006 |
| JP | 2010-228578 A | 10/2010 |
| WO | 2007/111786 A1 | 10/2007 |

* cited by examiner

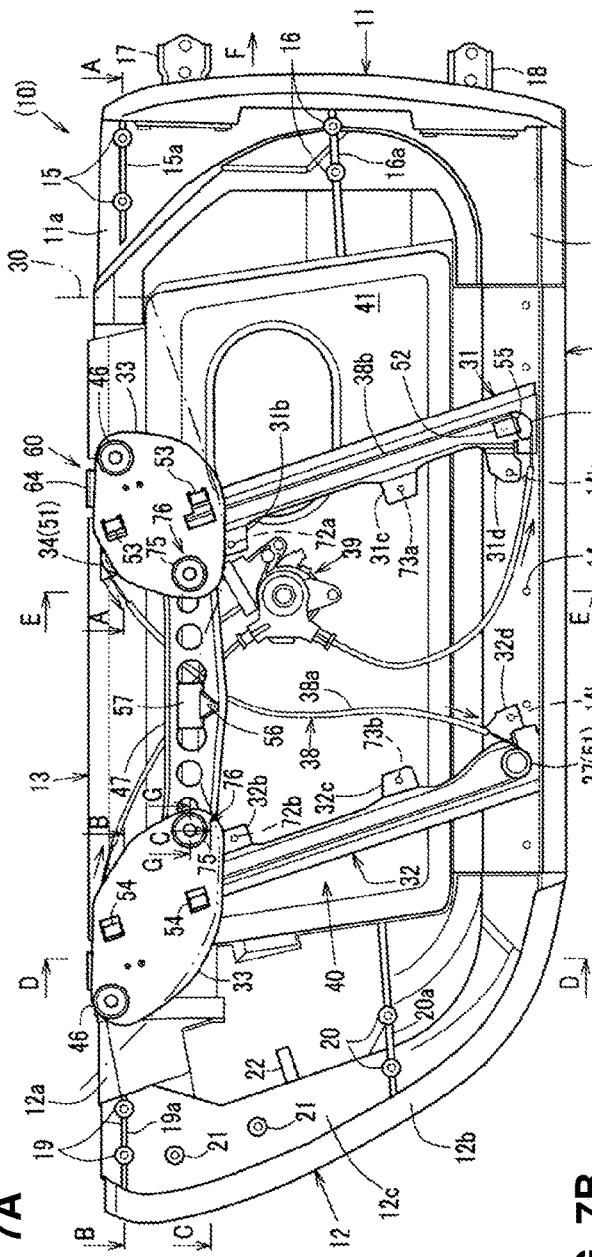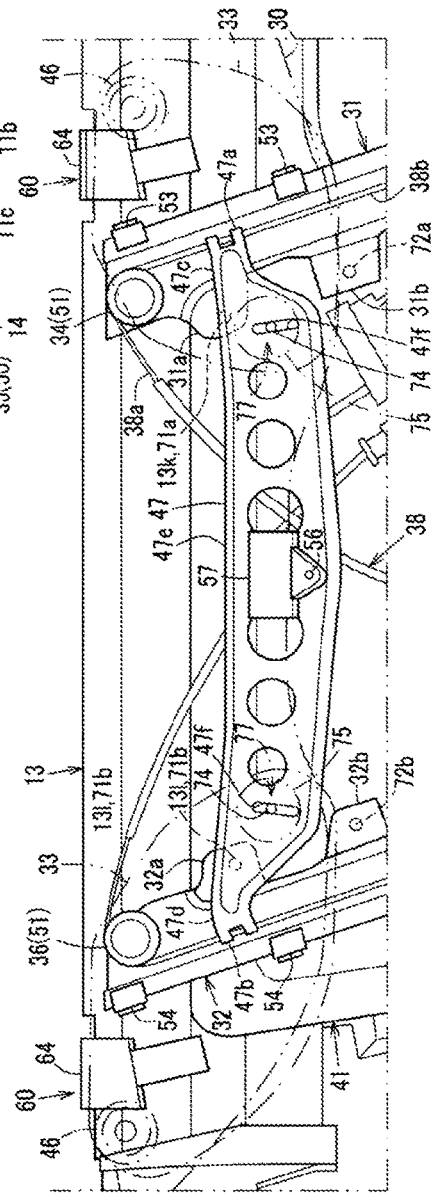

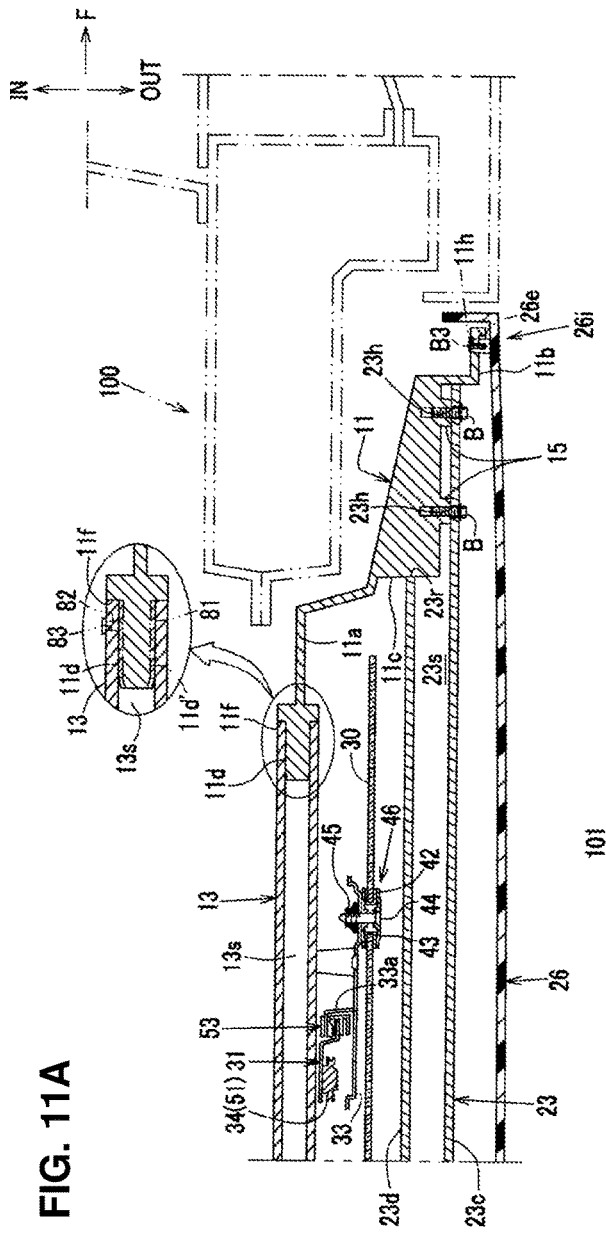
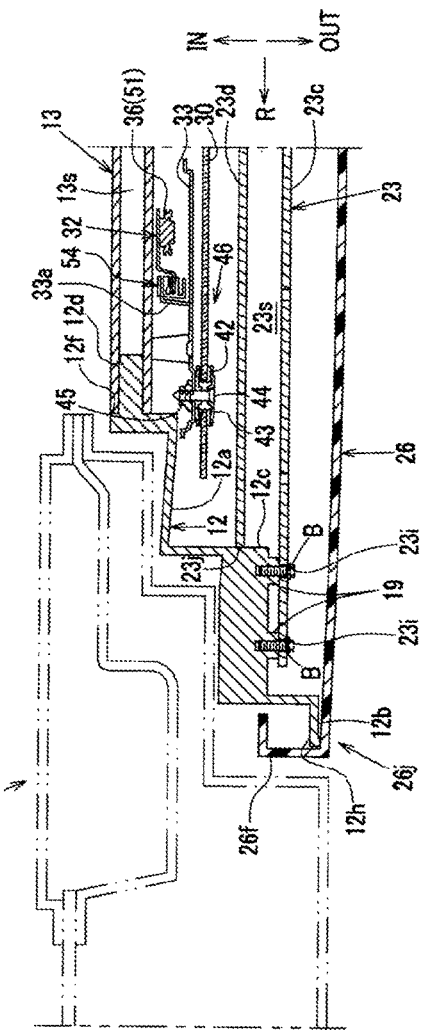
FIG. 11A
FIG. 11B

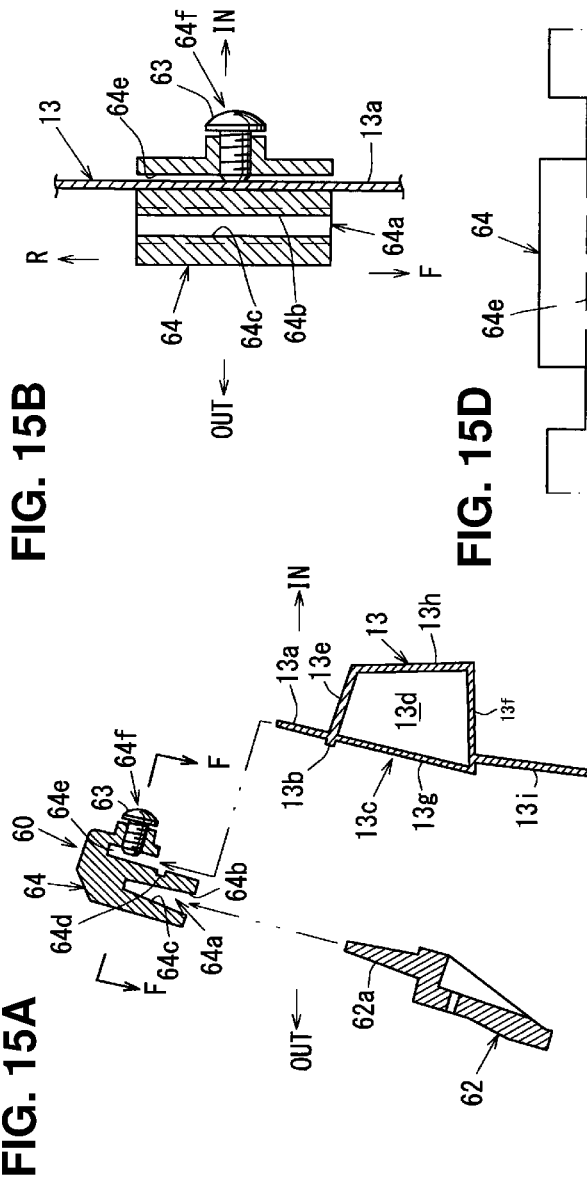
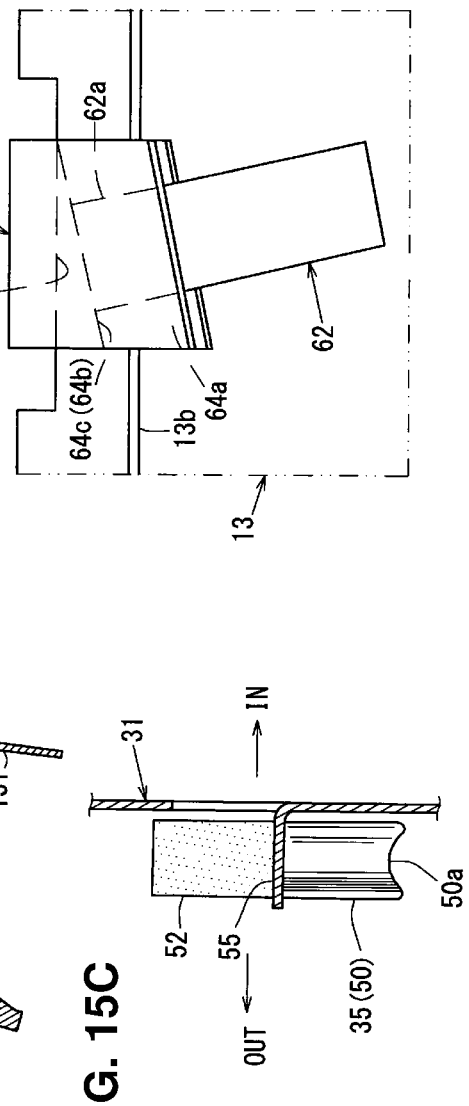
FIG. 15A
FIG. 15B
FIG. 15C
FIG. 15D

DOOR STRUCTURE OF AUTOMOTIVE VEHICLE AND ASSEMBLY METHOD OF THE SAME

BACKGROUND OF THE INVENTION

The present invention relates to a door structure of an automotive vehicle which is applicable to a side door or a back door of the vehicle, and an assembly method of the same.

In general, since a sashless type of door can secure a properly-wide cross section of a roof side rail or a pillar upper portion, this type of door is advantageous in making a light-weight and high-rigidity vehicle body. However, a door window cannot be guided by a door sash, so that the sashless type of door is required to increase the door-window support rigidity of a device to elevate or lower the door window, compared to a sash type of door. Accordingly, it may be considered to increase the door-window support rigidity of the elevation/lowering device (a window regulator) that two guide rails for guiding elevation or lowering of the door window, which are one of components constituting the elevation/lowering device, are provided and also the components of the elevation/lowering device (window regulator), including the above-described guide rails and a module plate to which the guide rails are attached, are configured to be reinforced, for example. However, this may provide the elevation/lowering device with large size, heavy weight improperly.

Meanwhile, a door assembly in which the elevation/lowering device is attached to a door structure (300) comprising a reinforced member, such as a beltline reinforcement, from an inward side in a vehicle width direction has been proposed, which is disclosed in WO2007/111786 A1. This door assembly is a type of attaching the elevation/lowering device from the inside of the door structure (300). While this door assembly is applied to the sashless type of door, there is a problem that when the large-sized elevation/lowering device described above is assembled to the door structure (300), its work space is not provided properly and a weight of the elevation/lowering device increases, so that the assemblability of that may be deteriorated. Moreover, there is a concern accordingly that in a case in which there occurs a slight gap between the door structure (300) and the elevation/lowering device assembled to the door structure (300), the sealing performance is deteriorated, so that some water may come into an inside space of the door through a door-window insertion hole provided at an upper portion of the door. Consequently, there happen concerns that the water may stay inside the door and cause rusting, or further come into a cabin improperly.

Further, another type of door in which an elevation/lowering device of a window glass, as the door window, is inserted through a window-glass insertion groove provided at an upper portion of a door body, as the door-window insertion hole, and assembled to an inner panel from an outward side in the vehicle width direction has been proposed as well, which is disclosed in Japanese Patent Laid-Open Publication No. S61-146990. However, the above-described attaching of the elevation/lowering device to a specified attachment position inside the door body by inserting the elevation/lowering device through the window-glass insertion groove having a width which is not sufficiently wide, compared to a width of the elevation/lowering device, may require some more improvement in terms of the assemblability.

SUMMARY OF THE INVENTION

Accordingly, an object of the present invention is to provide a door structure of an automotive vehicle and an assembly method of the same which can reinforce an inward frame by a module panel and a guide rail and also improve the assemblability and the sealing performance (water-stopping performance) even if the module panel or the guide rail are made large-sized for reinforcement.

A door structure of an automotive vehicle of the present invention is provided with a sashless door body comprising an inward frame and an outward frame, a window regulator provided with a guide rail to guide a door window so as to elevate or lower the door window, a module plate attached to the inward frame, and a door outer panel, wherein the guide rail is fixed to the module plate from an outward side in a vehicle width direction, the module plate is fixed to an edge of an opening portion provided at the inward frame from the outward side in the vehicle width direction and the guide rail is fixed further from the outward side in the vehicle width direction, an attachment portion capable of attaching the outward frame to the inward frame is provided, and another attachment portion capable of attaching the door outer panel to the outward frame attached to the inward frame is provided.

According to the present invention, the inward frame is reinforced by the module plate and the guide rail, so that the assemblability and the sealing performance can be improved.

In an embodiment of the present invention, the attachment portion attaching the outward frame to the inward frame is capable of attaching the outward frame to the inward frame later than an attachment timing of the guide rail and the module plate, the outward frame is provided at least along an upper portion of the sashless door body, and the attachment portion capable of attaching the door outer panel is provided at the outward frame provided along the upper portion of the sashless door body. According to this embodiment, making the module plate large-sized and the door rigidity can be compatibly attained more effectively.

In another embodiment of the present invention, the guide rail comprises a rail portion which extends vertically and curves such that an upper side thereof is positioned inward, in the vehicle width direction, relative to a lower side thereof in a vehicle front view, a wall portion which extends toward the module plate from the rail portion, and an attachment portion which extends from an end of the wall portion which is positioned on the side of the module plate so as to be attached to the module plate. According to this embodiment, the formability (dimensional accuracy) of the guide rail and the support rigidity of the door window can be improved.

In another embodiment of the present invention, the inward frame comprises a pair of vertical frame portions which are made of light-metal casting and provided at front-and-rear both sides, in a longitudinal direction, thereof and a connecting member which is made of light-metal extrusion molding and extends between the vertical frame portions. According to this embodiment, the light-weight and high-rigidity structure made by using the connecting member and the curved elevation/lowering locus of the door window can be compatibly attained easily.

An assembly method of a door structure of an automotive vehicle of the present invention is provided with a sashless door body comprising an inward frame and an outward frame, a window regulator provided with a guide rail to guide a door window so as to elevate or lower the door window, a module plate attached to the inward frame, and a door outer panel, the assembly method comprising steps of fixing the guide rail to the module plate from an outward side in a vehicle width direction, fixing the module plate to an edge of an opening portion provided at the inward frame from the outward side in the vehicle width direction and fixing the guide rail further from the outward side in the vehicle width direction, attaching the outward frame to the inward frame, and attaching the door outer panel to the outward frame.

Other features, aspects, and advantages of the present invention will become apparent from the following description which refers to the accompanying drawings.

BRIEF DESCRIPTION OF THE DRAWINGS

FIGS. 7A, 7B are explanatory diagrams of the structure in a state in which the door outer panel is detached.

FIGS. 11A, 11B are sectional views of the side door structure taken along lines A-A and B-B of FIG. 7A.

FIG. 15A is an exploded view of a pressing member, a receiving member, and a door-beltline constituting member, FIG. 15B is a sectional view taken along line F-F of FIG. 15A, FIG. 15C is an explanatory diagram showing an attachment structure of a fan-shaped guide member and a down stopper, and FIG. 15D is an explanatory diagram of the receiving member.

DETAILED DESCRIPTION OF THE INVENTION

Figure 1:
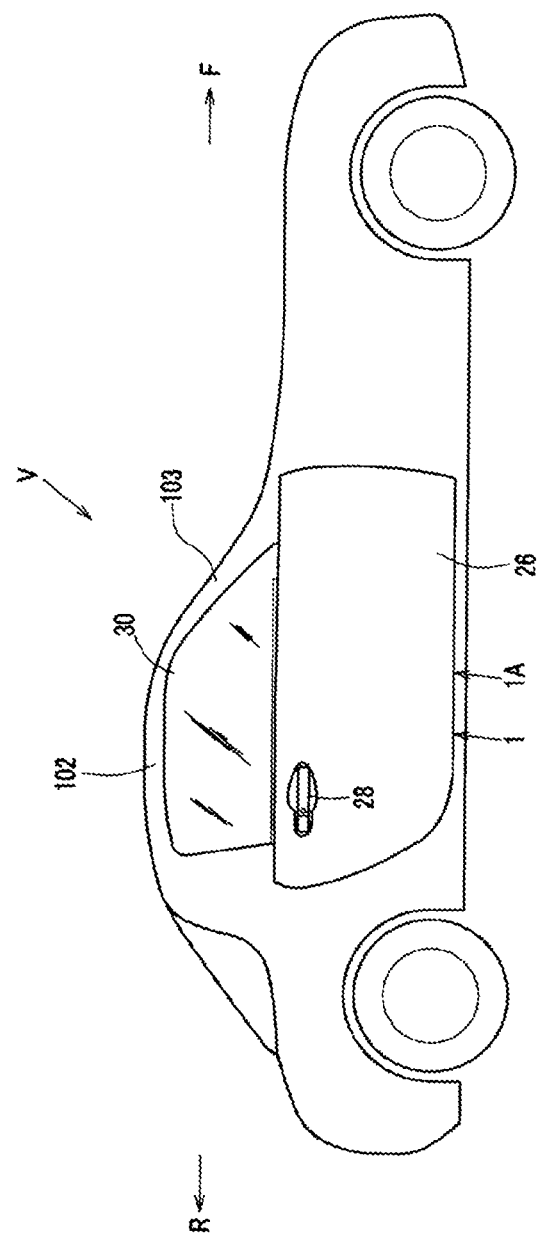
FIG. 1 is a right side view of an automotive vehicle which has a sashless-type side door structure.
Figure 2:
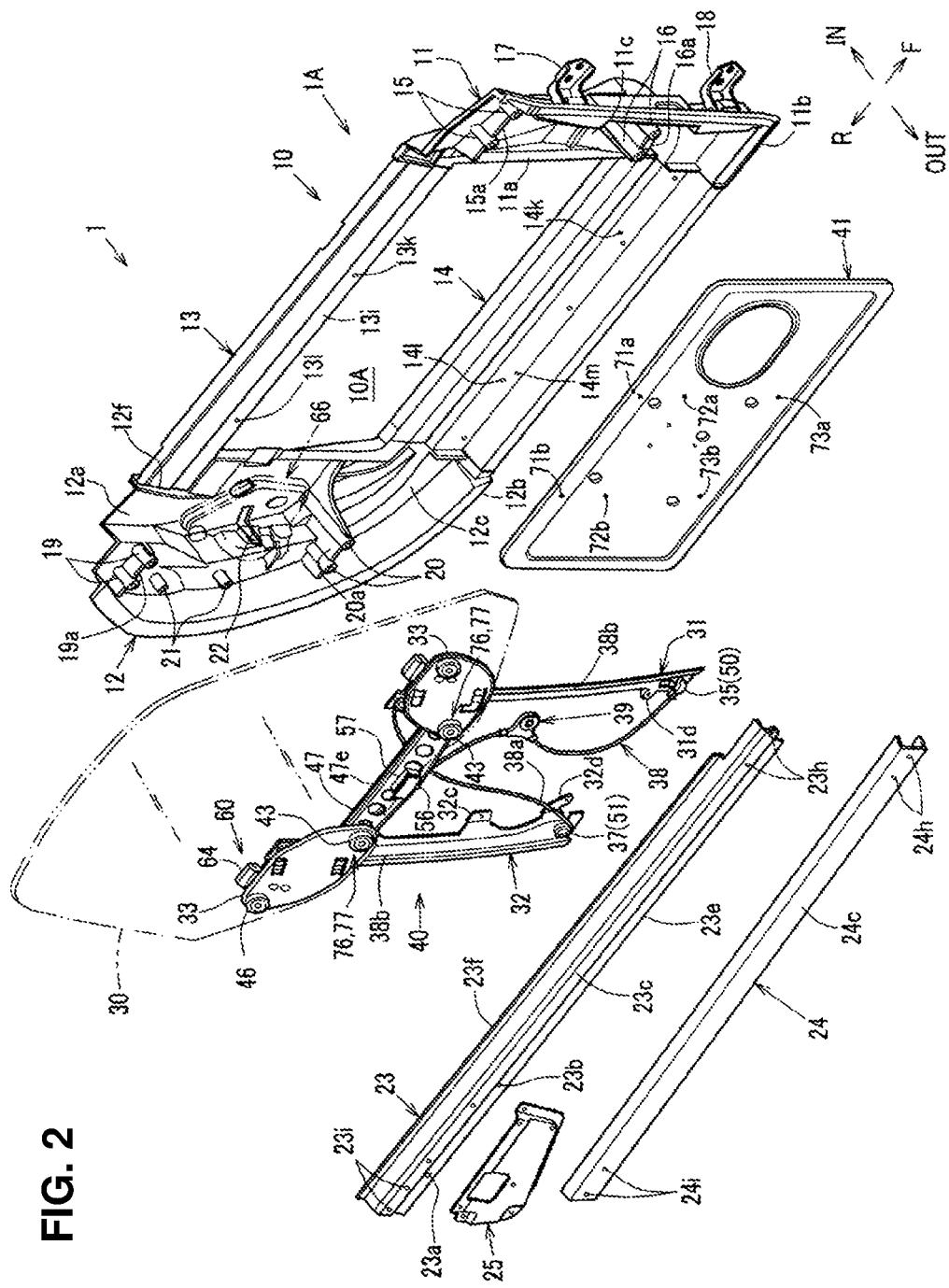
FIG. 2 is an exploded perspective view of the door structure in a state in which a door outer panel is removed.
Figure 3:
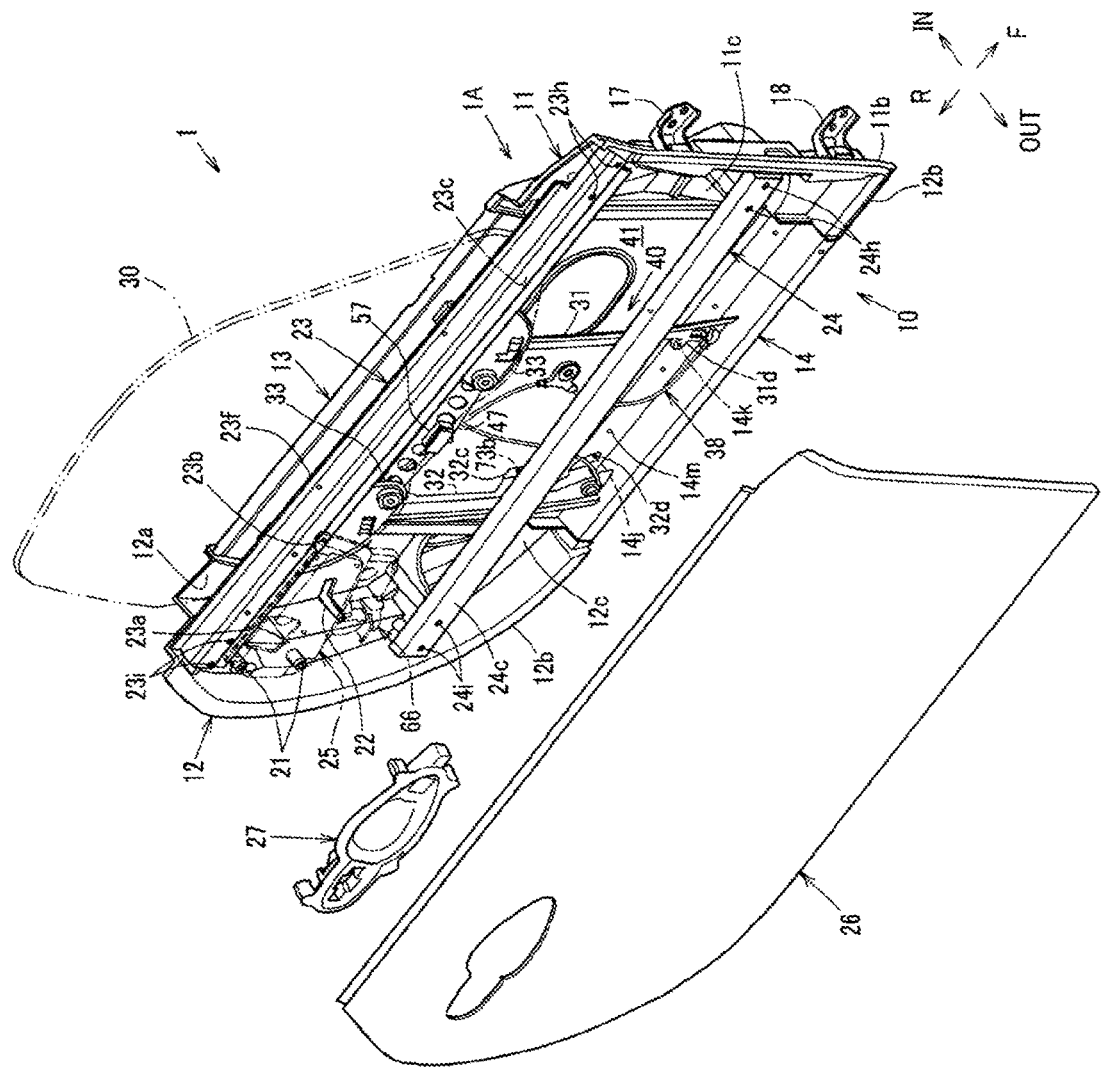
FIG. 3 is a perspective view showing an internal structure of the door structure without the door outer panel.
Figure 4:
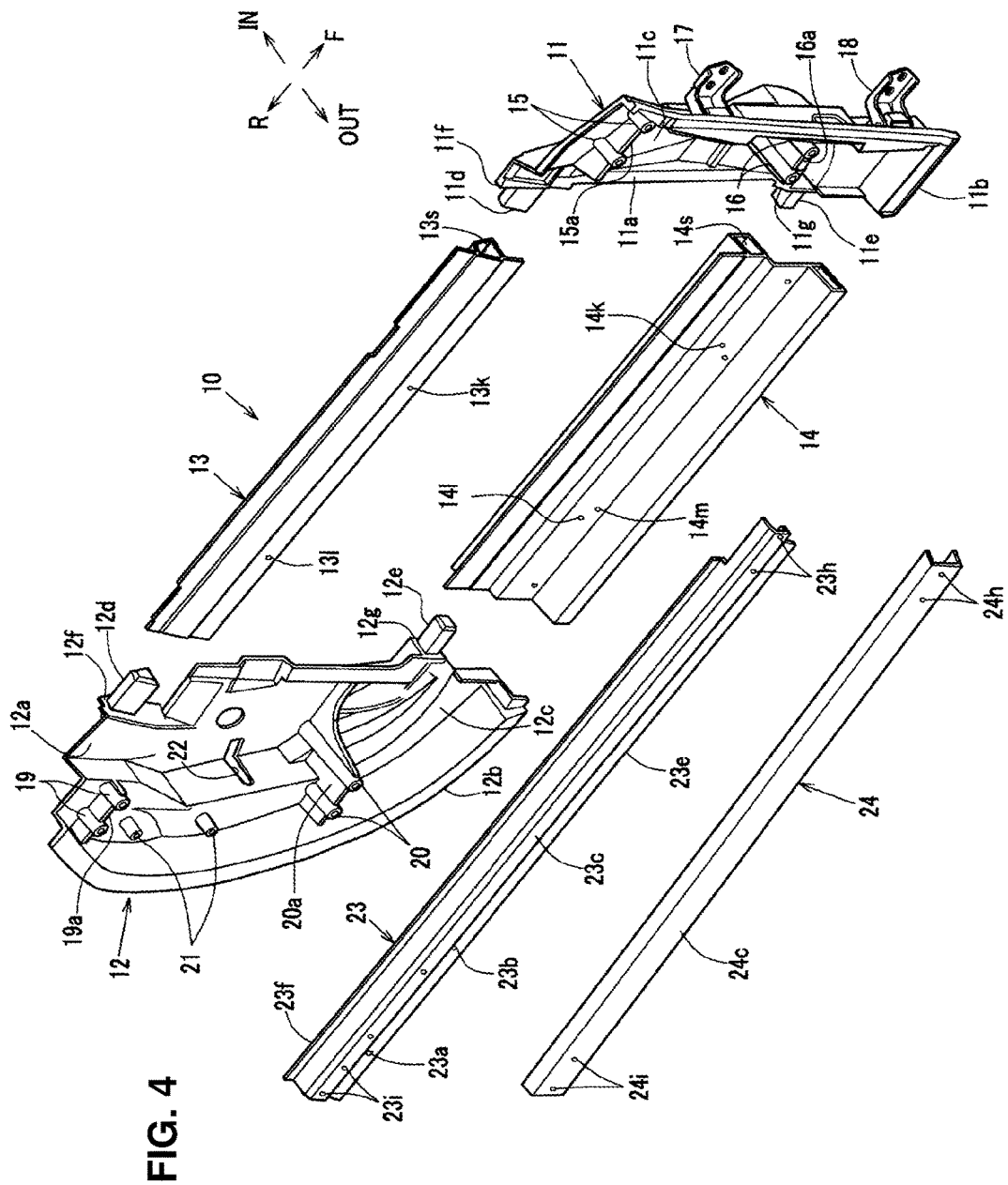
FIG. 4 is an exploded perspective view of a door frame when viewed from an outward side, in a vehicle width direction, of the vehicle.
Figure 5:
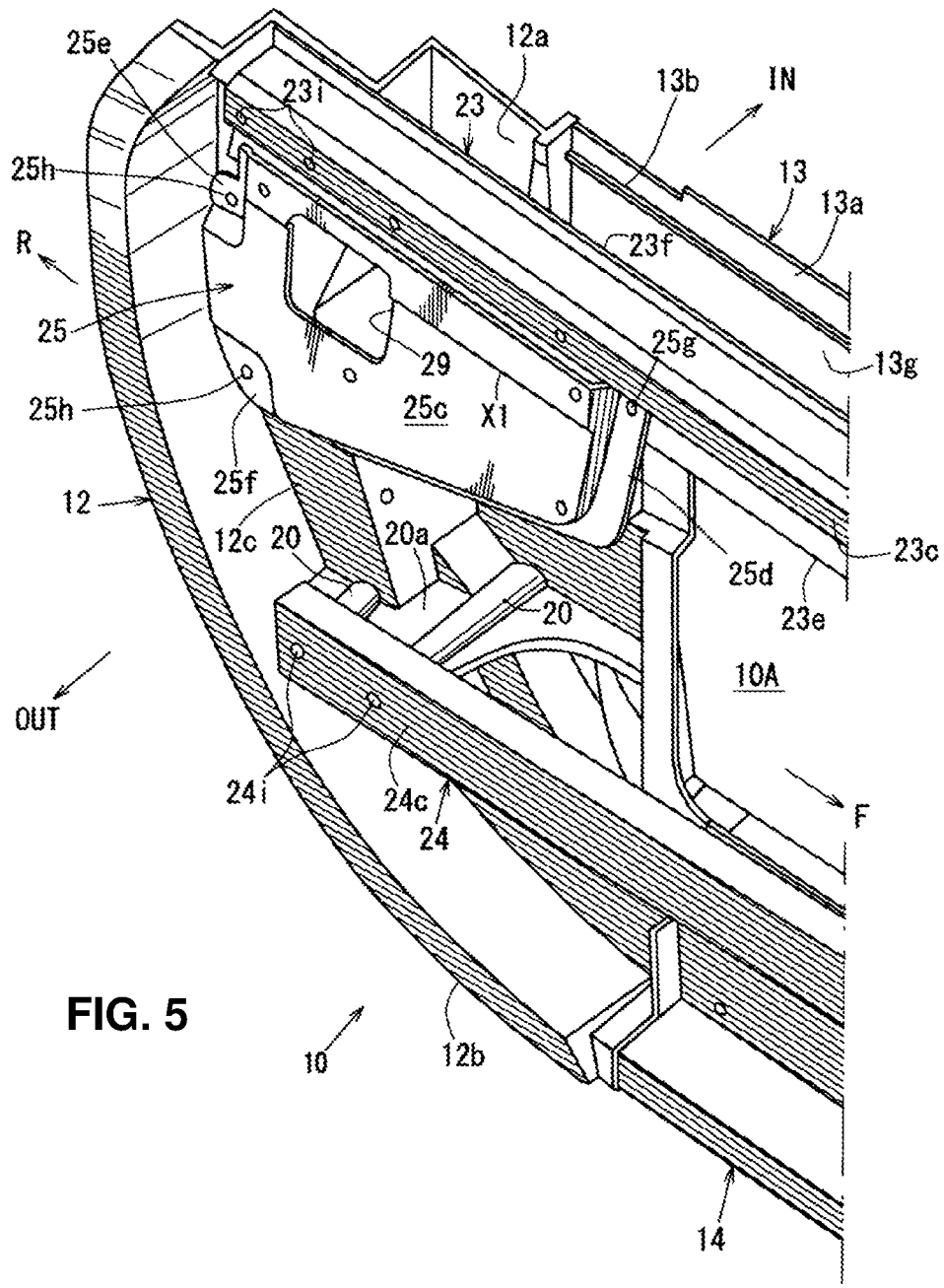
FIG. 5 is a major-part enlarged perspective view of the structure shown in FIG. 3 in a state in which an outer-handle attaching bracket is provided.
Figure 6A:
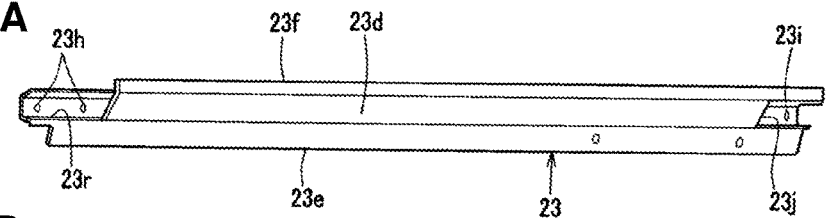
FIGS. 6A, 6B, 6C are exploded perspective views of the door frame when viewed from an inward side, in the vehicle width direction, of the vehicle.
Figure 6B:
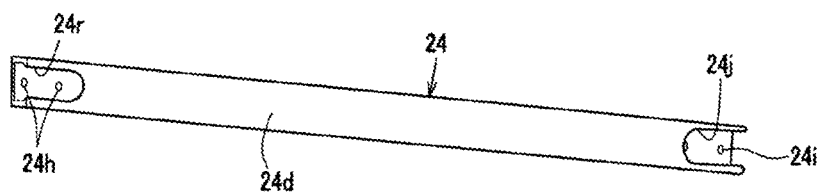
Figure 6C:
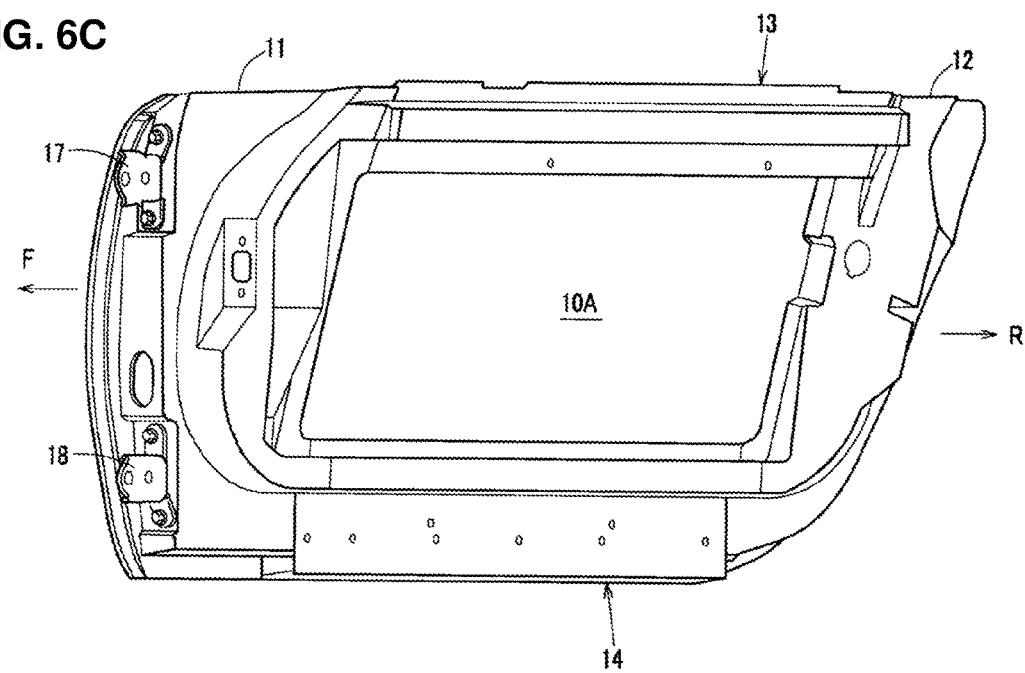
Figure 8:
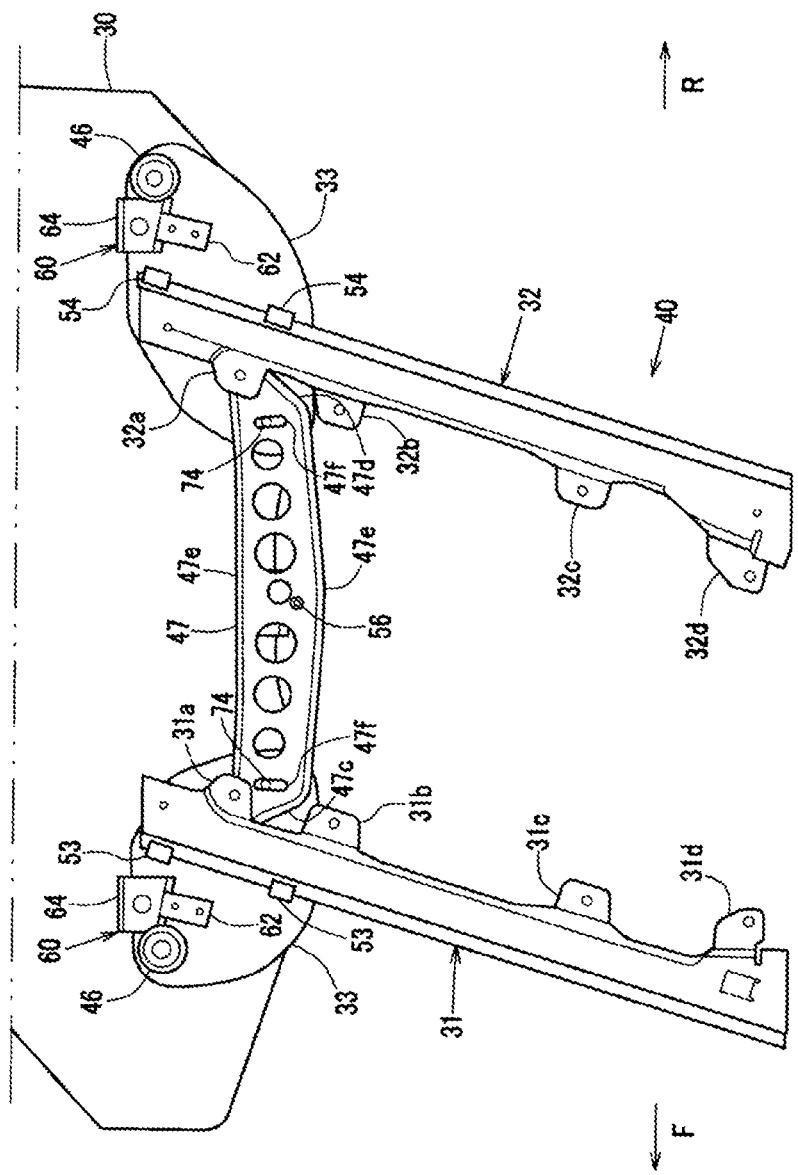
FIG. 8 is an explanatory diagram of a structure of a window regulator when viewed from the inward side, in the vehicle width direction, of the vehicle.
Figure 9:
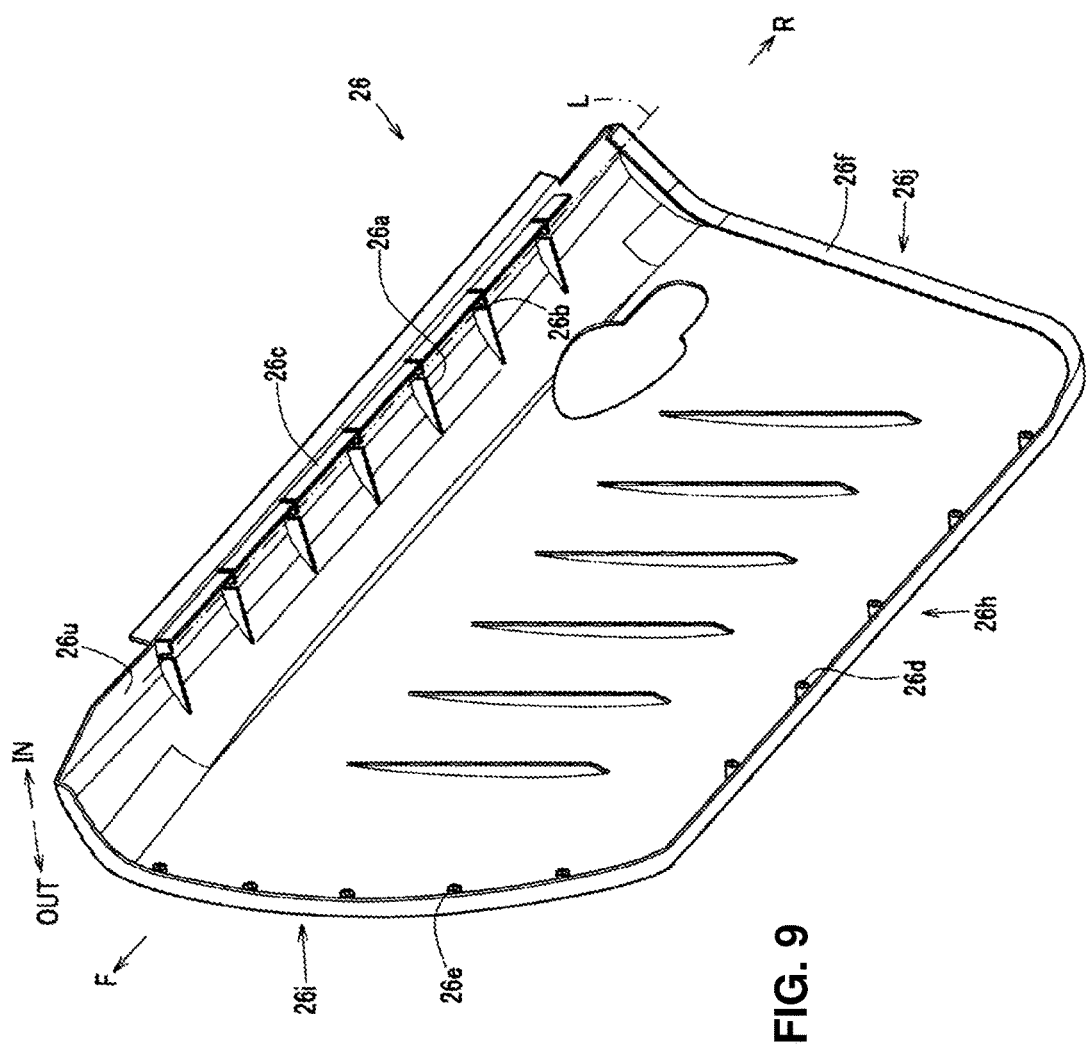
FIG. 9 is a perspective view of the door outer panel when viewed from below.
Figure 10A:
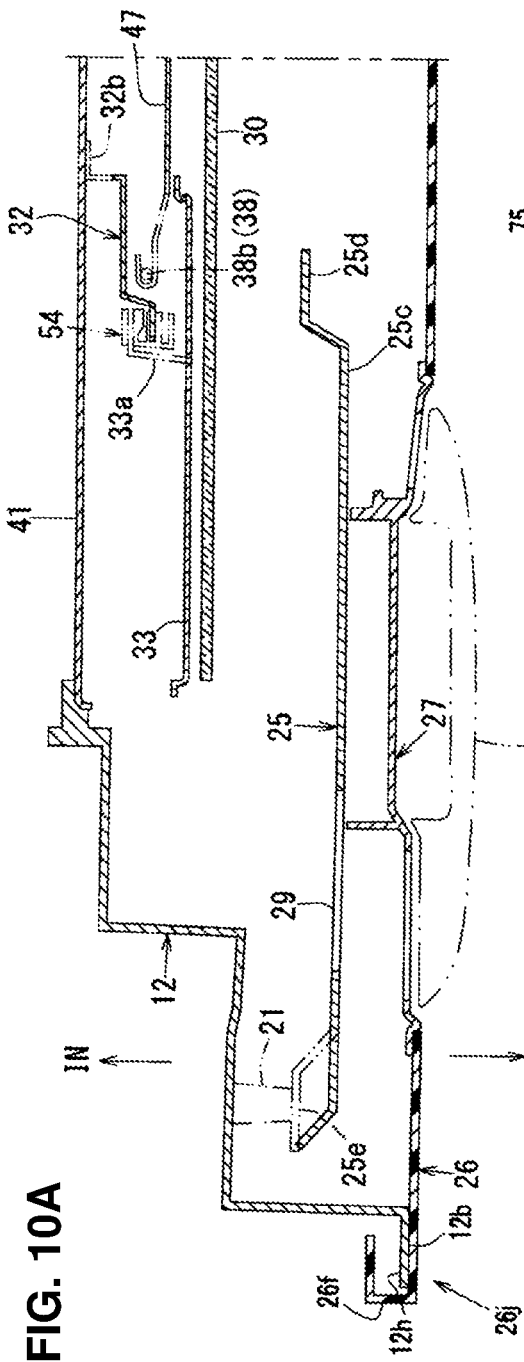
FIG. 10A is a sectional view of the side door structure taken along line C-C of FIG. 7A.
Figure 10C:
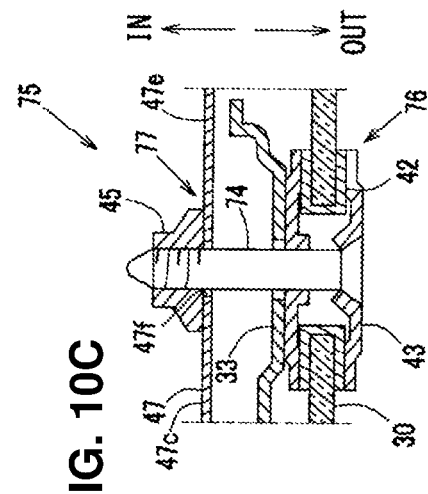
FIG. 10C is an enlarged sectional view taken long line G-G of FIG. 7A.
Figure 10B:
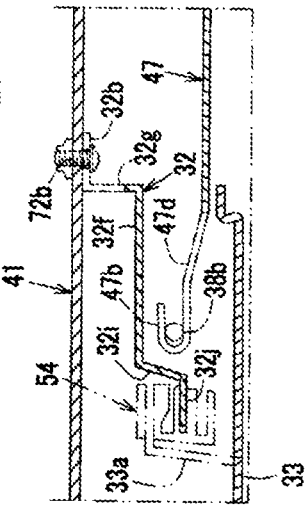
FIG. 10B is a major-part enlarged view of FIG. 10A.
Figure 12:
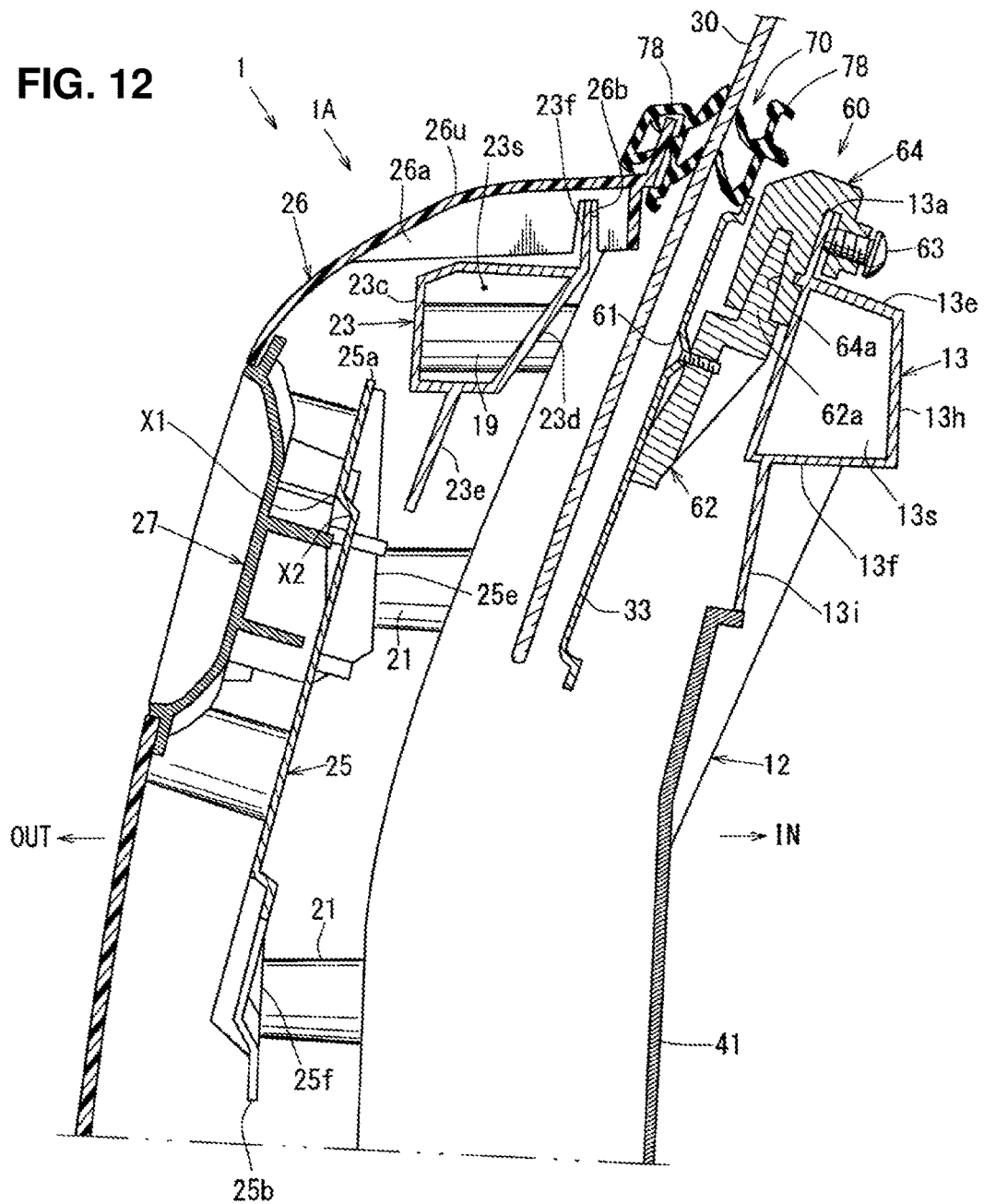
FIG. 12 is a major-part perspective sectional view of the side door structure taken along line D-D of FIG. 7A.
Figure 13:
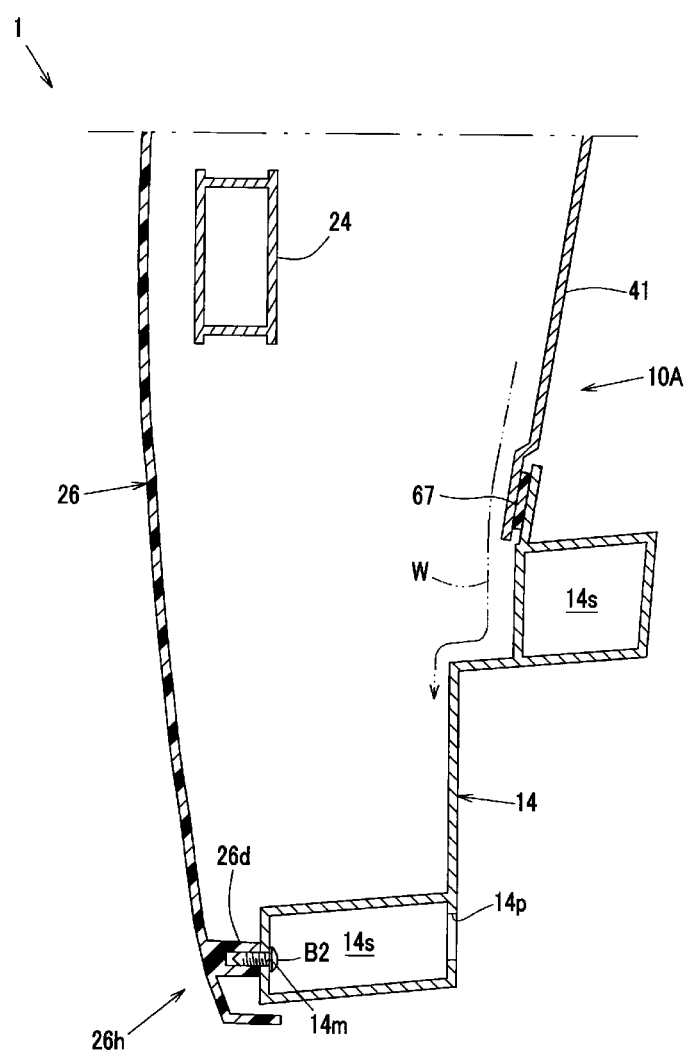
FIG. 13 is a major-part perspective sectional view of the side door structure taken along line E-E of FIG. 7A.

Hereafter, an embodiment of the present invention will be specifically described referring to the drawings. The drawings show a door structure of an automotive vehicle. FIG. 1 is a right side view of an automotive vehicle which has a sashless-type side door structure, FIG. 2 is an exploded perspective view of the door structure in a state in which a door outer panel is removed, FIG. 3 is a perspective view showing an internal structure of the door structure without the door outer panel, FIG. 4 is an exploded perspective view of a door frame when viewed from an outward side, in a vehicle width direction, of the vehicle, FIG. 5 is a major-part enlarged perspective view of the structure shown in FIG. 3 in a state in which an outer-handle attaching bracket is provided, FIGS. 6a, 6B, 6C are perspective views for explaining a beltline reinforcement outer, an impact bar, and an inward frame, respectively, when viewed from an inward side, in the vehicle width direction, of the vehicle, FIG. 7A is an explanatory diagram of the structure in a state in which the door outer panel is detached and FIG. 7B is a major-part enlarged view of FIG. 7A, FIG. 8 is an explanatory diagram of a structure of a window regulator when viewed from the inward side, in the vehicle width direction, of the vehicle, FIG. 9 is a perspective view of the door outer panel when viewed from below, FIG. 10A is a sectional view of the side door structure taken along line C-C of FIG. 7A, FIG. 10B is a major-part enlarged view of FIG. 10A, and FIG. 10C is an enlarged sectional view taken long line G-G of FIG. 7A, FIG. 11A is a sectional view taken along line A-A of FIG. 7A and FIG. 11B is a sectional view taken along line B-B of FIG. 7A, FIG. 12 is a major-part perspective sectional view of the side door structure taken along line D-D of FIG. 7A, and FIG. 13 is a major-part perspective sectional view of the side door structure taken along line E-E of FIG. 7A. In the figures showing the embodiment described below, an arrow F shows a vehicle forward side, an arrow R shows a vehicle rearward side, an arrow IN shows a vehicle inward side (hereinafter, referred to as "inward" or "inward side"), and an arrow OUT shows a vehicle outward side (hereafter, referred to as "outward' or "outward side").

The door structure of the automotive vehicle of the present embodiment is applied to a sashless-type side door 1, which comprises a door body 1A and a door window glass 30 as a door window (including a reinforced-plastic made window). The door body 1A comprises, as shown in FIGS. 2 and 3, a door frame 10, a door outer panel 26 which forms a side door body, and a window regulator 40 to elevate or lower the door window glass 30.

<Door Frame Structure>

As shown in FIGS. 2-7A, the door frame 10 comprises vertical frame portions 11, 12 which are provided at both sides (i.e., the front-side vertical wall portion 11 and the rear-side vertical frame portion 12), in a vehicle longitudinal direction, of the door frame 10 and plural connecting frames 13, 14, 23, 24 which connect the front-side vertical frame portion 11 and the rear-side frame portion 12 in the vehicle longitudinal direction, respectively. An inner space of the door body 1A is formed by the door frame 10 and the door outer panel 26 (see FIGS. 12 and 13). Herein, as shown in FIG. 12, a door-window-glass insertion hole 70, which a door window glass 30 gets into the inner space of the door body 1A through or gets out of, is provided at an upper portion of the door body 1A. A weather strip 78 is attached to the door-window-glass insertion hole 70 such that it extends in the vehicle longitudinal direction and tightly contacts both sides, in the vehicle width direction, of the door window glass 30.

The connecting frames 13, 14, 23, 24, which are made of aluminum-alloy extrusion molding, comprise, as shown in FIGS. 2-5, the inward connecting frames 13, 14 and the outward-side connecting frames 23, 24 which are positioned on inward and outward sides at upper and lower levels between the front-side vertical frame portion 11 and the rear-side vertical frame portion 12, respectively. The inward connecting frames 13, 14 comprise the beltline reinforcement inner 13 as an inward-upper connecting member which is arranged on the inward side at an upper portion of the door frame 10 and the lower frame 14 as an inward-lower connecting member which is arranged on the inward side at a lower portion of the door frame 10. The outward-side connecting frames 23, 24 comprise the beltline reinforcement outer 23 as an outward-upper connecting member which is arranged on the inward side at the upper portion of the door frame 10 and the impact bar 24 as an outward-middle-level connecting member which is arranged at a level corresponding to a waist of a passenger seated in a seat in a cabin, that is—at a middle level, in a vehicle vertical direction, of the door frame 10.

As shown in FIG. 11A, the front-side vertical frame portion 11, which is made of aluminum-alloy casting, is positioned on the outward side, in the vehicle width direction, of a hinge pillar 100 when a door is closed such that it overlaps the hinge pillar 100 when viewed from a vehicle side. The front-side vertical frame portion 11, as shown in FIGS. 2-4, comprises a plate-shaped base portion 11a which is positioned on the inward side and extends in the vertical direction, a protrusion portion 11b which protrudes outward from a rear edge of the base portion 11a along its lower edge, and a step portion 11c which protrudes outward in a step shape at a boundary portion between the base portion 11a and the protrusion portion 11b. As shown in FIG. 4, protrusion pieces 11d, 11e are integrally formed at an upper rear end and a lower rear end of the front-side vertical frame portion 11 as an inward-side attachment portion for attaching a front portion of the beltline reinforcement inner 13 or a front portion of the lower frame 14. The protrusion piece 11d formed at the upper rear end of the front-side vertical frame portion 11 is provided to protrude rearward from the flange portion 11f so as to engage with a hollow portion 13s of the beltline reinforcement inner 13 which is formed in a hollow shape (see FIGS. 4 and 11A). The protrusion piece 11e formed at the lower rear end of the front-side vertical frame portion 11 is provided to protrude rearward from a flange portion 11g which is formed at a lower rear end of the base portion 11a of the front-side vertical frame portion 11 so as to engage with a hollow portion 14s of the lower frame 14 which is formed in a hollow shape (see FIG. 4).

As shown in FIGS. 2, 4 and 7A, plural boss portions 15 (two, in the present embodiment) are integrally formed at the upper portion of the front-side vertical frame portion 11 as an outward attachment portion for attaching a front portion of the beltline reinforcement outer 23 such that they are longitudinally spaced apart from each other, and plural boss portions 16 (two, in the present embodiment) are integrally formed at a middle portion, in the vertical direction, of the front-side vertical frame portion 11 as an outward attachment portion for attaching a front portion of the impact bar 24 such that they are longitudinally spaced apart from each other. The two boss portions 15 and the two boss portions 16 are connected by ribs 15a, 16a which respectively extend in the vehicle width direction. Herein, as shown in FIGS. 2-4, 6C and 7A, a pair of upper-and-lower hinge brackets 17, 18 are provided at the front end of the front-side vertical frame portion 11, and these hinge brackets 17, 18 are fixed to portions which correspond to a door opening portion of a vehicle body by using bolts.

Further, the above-described rear-side vertical frame portion 12 is made of aluminum-alloy casting, which forms a rear side of the door body 1A. As shown in FIG. 11B, the rear-side vertical frame portion 12 is positioned on the outward side, in the vehicle width direction, of a rear pillar 101 when the door is closed such that it overlaps the rear pillar 101 when viewed from the vehicle side. The rear-side vertical frame portion 12, as shown in FIGS. 2-5 and 7A, comprises a base portion 12a, a protrusion portion 12b, and a step portion 12c, similarly to the front-side vertical frame portion 11. As shown in FIG. 4, protrusion pieces 12d, 12e are integrally formed at an upper front end and a lower front end of the rear-side vertical frame portion 12 as an inward-side attachment portion for attaching a rear portion of the beltline reinforcement inner 13 or a rear portion of the lower frame 14. The protrusion piece 12d formed at the upper front end of the rear-side vertical frame portion 12 is provided to protrude forward from a flange portion 12f so as to engage with the hollow portion 13s of the beltline reinforcement inner 13 formed in the hollow shape (see FIGS. 4 and 11B). The protrusion piece 12e formed at the lower front end of the rear-side vertical frame portion 12 is provided to protrude forward from a flange portion 12g which is formed at a lower front end of the base portion 12a of the rear-side vertical frame portion 12 so as to engage with the hollow portion 14s of the lower frame 14 formed in the hollow shape (see FIG. 4).

Further, as shown in FIGS. 2, 4 and 7A, plural boss portions 19 (two, in the present embodiment) are integrally formed at the upper portion of the rear-side vertical frame portion 12 as an outward attachment portion for attaching a rear portion of the beltline reinforcement outer 23 such that they are longitudinally spaced apart from each other, and plural boss portions 20 (two, in the present embodiment) are integrally formed at a middle portion, in the vertical direction, of the rear-side vertical frame portion 12 as an outward attachment portion for attaching a rear portion of the impact bar 24 such that they are longitudinally spaced apart from each other. The two boss portions 19 and the two boss portions 20 are connected by ribs 19a, 20a which respectively extend in the vehicle width direction.

As shown in FIGS. 2-4 and 7A, plural boss portions 21 for fixing a rear portion of an outer-handle attaching bracket 25 (see FIG. 5), which will be described later, are formed integrally with a portion of the step portion 12c which is located between the boss portions 19 and the boss portions 20 such that they are spaced apart from each other.

Further, as shown in FIGS. 2-4 and 7A, a striker engagement groove 22 is provided at a portion of the rear-side vertical frame portion 12 which is located between the boss portions 19 and the boss portions 20 such that it opens over an area from the base portion 12a to a rising portion of the step portion 12c. This striker engagement groove 22 is positioned so as to correspond to a latch-mechanism arrangement portion. A latch mechanism 66 (see FIG. 2) which is arranged at the latch-mechanism arrangement portion comprises a latch as a hook member for opening or closing the side door 1 and a latch portion to drive the latch, not illustrated. The latch is configured to detachably engage with a U-shaped connecting metal fitting, thereby locking the side door 1 in a closed state.

The beltline reinforcement inner 13 and the lower frame 14 are made of the extrusion molding as described above, and the beltline reinforcement inner 13 has the hollow portion 13s (closed cross section) extending in the vehicle longitudinal direction which engages with the above-described protrusion pieces 11d, 12d as shown in FIGS. 4, 11A, 11B, 12 and 13, and the lower frame 14 has the hollow portion 14s (closed cross section) extending in the vehicle longitudinal direction which engages with the above-described protrusion pieces 11e, 12e as shown in FIGS. 4 and 13.

Further, the protrusion piece 11d provided at the upper rear end of the front-side vertical frame portion 11 is inserted tightly and engages with a front portion of the hollow portion 13s of the beltline reinforcement inner 13 as shown in FIGS. 2, 3, 6C, 7A and 11A, and the protrusion piece 12d provided at the upper front end of the rear-side vertical frame portion 12 is inserted tightly and engages with a rear portion of the hollow portion 13s of the beltline reinforcement inner 13 as shown in FIGS. 2, 3, 5, 6C, 7A and 11B. Likewise, the protrusion piece 11e provided at the lower rear end of the front-side vertical frame portion 11 is inserted tightly and engages with a front portion of the hollow portion 14s provided at the upper portion of the lower frame 14, and the protrusion piece 12e provided at the lower front end of the rear-side vertical frame portion 12 is inserted tightly and engages with a rear portion of the hollow portion 14s provided at the upper portion of the lower frame 14 (see FIGS. 2, 3 and 6C). Thereby, the front-side vertical frame portion 11, the rear-side vertical frame portion 12, the beltline reinforcement inner 13, and the lower frame 14 are assembled together in the frame shape as the inward frames 11, 12, 13, 14 of the door frame 10, and, as shown in FIGS. 2, 5, and 6C, and an opening portion 10A is formed at a central portion of the inward frames 11, 12, 13, 14.

Further, as shown in FIGS. 2 and 4, attachment portions 13k, 13l for attaching upper portions of guide rails 31, 32 (see FIG. 2), which will be described later, are provided at front and rear positions of an outward-side face, in the vehicle width direction, of a rib 13i which extends downward at the beltline reinforcement inner 13, and attachment portions 14k, 14l for attaching lower portions of guide rails 31, 32 are provided at front and rear positions of an outward-side face, in the vehicle width direction, of the lower frame 14. As shown in FIGS. 2-4 and 7A, plural attachment portions 14m for attaching the lower portion of the door outer panel 26 (see FIG. 3) are provided at the lower frame 14 substantially at regular intervals in the vehicle longitudinal direction.

Moreover, the beltline reinforcement outer 23 is made of the extrusion molding so as to have a hollow-shaped cross section extending in the vehicle longitudinal direction, and as shown in FIGS. 2-6A, 11A, 11B and 12 especially, comprises a hollow portion 23s (closed cross section) formed inside thereof, an inward side face portion 23d which extends downward and outward, facing an outward face, in the vehicle width direction, of the door window glass 30, a lower rib 23e which extends downward and outward from a lower portion of the inward side face portion 23d, an upper rib 23f which extends upward from an upper portion of the above-described inward side face portion, and an outward side face portion 23c which faces the inward side face portion 23d with the hollow portion 23s interposed between them. As shown in FIG. 12, the inward side face 23d and the lower rib 23e of the beltline reinforcement outer 23 are configured to extend obliquely downward and outward, so that the beltline reinforcement outer 23 is refrained from deforming in the vertical direction or in the vehicle width direction. As shown in FIGS. 2, 6A, 11A, and 4 especially, plural attachment portions 23h (two, in the present embodiment) are provided to be spaced apart from each other in the longitudinal direction at the outward side face portion 23c of the front portion of the beltline reinforcement outer 23, corresponding to the plural boss portions 15 provided at the upper portion of the front-side vertical frame portion 11. Further, as shown in the same figures, plural attachment portions 23i (two, in the present embodiment) are provided to be spaced apart from each other in the longitudinal direction at the outward side face portion 23c of the rear portion of the beltline reinforcement outer 23, corresponding to the plural boss portions 19 provided at the upper portion of the rear-side vertical frame portion 12.

As shown in FIGS. 6A, 11A, and 11B, a cutout portion 23r is provided at a front end of the inward side face portion 23d of the beltline reinforcement outer 23 such that the inward side face portion 23d does not interfere with the rib 15a and the like when the attachment portions 23h are attached to the boss portions 15. Likewise, a cutout portion 23j is provided at a rear end of the inward side face portion 23d of the beltline reinforcement outer 23 such that the inward side face portion 23d does not interfere with the rib 19a and the like when the attachment portions 23i are attached to the boss portions 19 (see the same figures). As shown in FIGS. 3 and 11A, the boss portions 15 (see FIG. 4) at the upper portion of the front-side vertical frame portion 11 and the attachment portions 23h at the front portion of the beltline reinforcement outer 23 are fixed by using attaching member, such as bolts B (see FIG. 11A), and as shown in FIGS. 3, 5 and 11B, the boss portions 19 (see FIG. 4) at the upper portion of the rear-side vertical frame portion 12 and the attachment portions 23i at the rear portion of the beltline reinforcement outer 23 are fixed by using attaching member, such as bolts B (see FIG. 11B). Thus, as shown in FIGS. 3 and 5, the beltline reinforcement outer 23 faces the beltline reinforcement inner 13 on the outward side in the vehicle width direction. In the other figures than FIGS. 11A and 11B, illustration of the attaching member, such as the bolts B, is omitted.

Further, as shown in FIGS. 2-4, plural attachment portions 23a, 23b for fixing an outer-handle attaching bracket 25 (see FIG. 5), which will be described later, are provided at a rear portion of the lower rib 23e of the beltline reinforcement outer 23. As shown in FIGS. 2-6A, B, C, the upper rib 23f of the beltline reinforcement outer 23 extends straightly in the longitudinal direction so as to engage with an edge portion of an engagement recess portion 26b (see FIG. 9) which is formed at an engagement protrusion piece 26a (see FIG. 9), which will be described later, at the synthetic-resin made door outer panel 26.

As shown in FIGS. 2 and 6A, the impact bar 24 is made by the extrusion molding so as to have a hollow cross section. Plural attachment portions 24h (two, in the present embodiment) are provided to be spaced apart from each other in the longitudinal direction at an outward side face portion 24c of a front portion of the impact bar 24, corresponding to the plural boss portions 16 provided at the middle portion, in the vertical direction, of the front-side vertical frame portion 11. Further, plural attachment portions 24i (two, in the present embodiment) are provided to be spaced apart from each other in the longitudinal direction at the outward side face portion 24c of a rear portion of the impact bar 24, corresponding to the plural boss portions 20 provided at the middle portion, in the vertical direction, of the rear-side vertical frame portion 12.

As shown in FIG. 6B, a cutout portion 24r is provided at a front end of an inward side face portion 24d of the impact bar 24 such that the inward side face portion 24d does not interfere with the rib 16a and the like when the attachment portions 24h are attached to the boss portions 16. Likewise, a cutout portion 24j is provided at a rear end of the inward side face portion 24d of the impact bar 24 such that the inward side face portion 24d does not interfere with the rib 20a and the like when the attachment portions 24i are attached to the boss portions 20. As shown in FIG. 3, the boss portions 16 (see FIG. 2) at the middle portion, in the vertical direction, of the front-side vertical frame portion 11 and the attachment portions 24h (see the same figure) at the front portion of the impact bar 24 are fixed by using the attaching member, such as bolts, and as shown in FIGS. 3 and 5, the boss portions 20 (see FIG. 2) at the middle portion, in the vertical direction, of the rear-side vertical frame portion 12 and the attachment portions 24*i* at the rear portion of the impact bar 24 are fixed by using the attaching member, such as bolts. Thus, the impact bar 24 is attached in a slant shape such that its front end portion is located at a higher level than its rear end portion (see FIG. 3). Herein, illustration of attaching members at these portions is omitted.

<Structure of Outer-Handle Attaching Bracket>

As shown in FIGS. 2 and 3, a corner portion between an upper portion of the protrusion portion 12*b* of the rear-side vertical frame portion 12 and a rear portion of the beltline reinforcement outer 23 of the above-described door frame 10 corresponds to the above-described latch-mechanism arrangement portion, and the latch mechanism 66 is arranged at the latch-mechanism arrangement portion. Further, the panel-shaped outer-handle attaching bracket 25 which covers over the latch mechanism 66 from the outward side, in the vehicle width direction, of the vehicle is provided at the above-described corner portion as shown in FIGS. 3 and 5.

An outer-handle base 27 (see FIG. 3) which supports the door outer panel 26 on the inside is fixed to the outer-handle attaching bracket 25 with a contact as shown in FIGS. 10A and 12. As shown in FIG. 5, the above-described outer-handle attaching bracket 25 is formed in an inverse-trapezoidal shape, and extends in the vehicle longitudinal direction at the corner portion between the upper portion of the protrusion portion 12*b* and the rear portion of the beltline reinforcement outer 23 and slants such that its lower portion is positioned on the outward side, in the vehicle width direction, of the vehicle when viewed from the vehicle front (in an elevation view of the vehicle) as shown in FIG. 12. Specifically, the outer-handle attaching bracket 25 slants, as shown in FIG. 12, such that its upper end 25*a* is positioned on the inward side, in the vehicle width direction, of its lower end 25*b*, and its lower end 25*b* is positioned on the outward side, in the vehicle width direction, of its upper end 25*a* in an elevation view of the vehicle.

By providing the outer-handle attaching bracket 25 at the corner portion between the upper portion of the protrusion portion 12*b* of the rear-side vertical frame portion 12 and the rear portion of the beltline reinforcement outer 23 and also providing the outer-handle attaching bracket 25 to slant such that its lower portion is positioned on the outward side, in the vehicle width direction, of the vehicle in the elevation view of the vehicle as described above, the strength improvement of the corner portion both in the vertical direction and in the vehicle width direction is attained and the support rigidity improvement and the collision strength improvement of a door outer handle 28 (see FIGS. 1 and 10) are attained, and also the antitheft performance is secured by the outer-handle attaching bracket 25 covering the latch mechanism 66 from the vehicle outward side and vehicle upper side as well as the strength improvement of the corner portion.

As shown in FIG. 5, the outer-handle attaching bracket 25 includes a flange portion 25*d* which extends continuously to a front portion and a lower portion of a bracket body 25*c* and recess portions 25*e*, 25*f* which are attachment seats provided at a rear upper portion and a rear lower portion of the bracket body 25*c*. A fastening portion 25*g* which is provided at an upper end portion of the flange portion 25*d* and fastening portions 25*h*, 25*h* which are provided at the recess portions 25*e*, 25*f* are fixed to the attachment portion 23*b* and the boss portions 21, 21. As shown in FIGS. 5 and 12, ridgelines X1, X2 extending in the vehicle longitudinal direction are formed in parallel to each other at the bracket body 25*c* of the outer-handle attaching bracket 25, and an opening portion 29 (see FIG. 10) as a weak portion is formed at a portion of the ridgeline X1, X2. In the present embodiment, the opening portion 29 is used for arranging a key cylinder. The above-described ridgelines X1, X2 improve the vehicle-longitudinal direction rigidity and a load transmission performance of the outer-handle attaching bracket 25, and the above-described opening portion 29 prevents a stress from concentrating on a connection portion of the outer-handle attaching bracket 25 and the beltline reinforcement outer 23.

A load of the door outer panel 26 is transmitted to the outer-handle attaching bracket 25 by way of the respective elements 23*f*, 23*d*, 23*e* (see FIG. 13) of the beltline reinforcement outer 23 and the fastening portion 25*g* shown in FIG. 5, thereby providing load dispersion. The dispersed load is transmitted to the rear-side vertical frame portion 12. Further, a structural body which has a relatively-long and roughly-straight shape and extends obliquely outward and downward is formed by the beltline reinforcement outer 23 and the outer-handle attaching bracket 25, thereby increasing the rigidity both in the vertical direction and in the vehicle width direction.

In general, the upper portion of the side door is configured to be narrow from a vehicle design requirement and therefore the rigidity, in the vehicle width direction, thereof is not secured easily. Accordingly, the vertical direction rigidity is secured by extending the upper rib 23*f*, and also the vehicle-width direction rigidity is secured sufficiently by configuring both of the beltline reinforcement outer 23 and the outer-handle attaching bracket 25 to extend obliquely outward and downward as shown in FIG. 12. This obliquely-extending arrangement of the both 23, 25 produces a sufficient space for storing links and others of the latch mechanism inside these 23, 25 and makes the outer-handle attaching bracket 25 serve as a protector.

<Structure of Door Outer Panel and Attachment Structure to Door Frame>

As shown in FIGS. 3, 9, 12 and 13, the door outer panel 26 is made of resin and formed in a non-planar shape so as to provide a vehicle-body design. Specifically, as shown in FIGS. 9, 12, and 13, the door outer panel 26 includes an outward protrusion portion 26*u* which is configured such that an upper portion thereof protrudes greatly, curving outward, and also this door outer panel 26 is configured to have a smoothly-curved vertical cross section, which extends downward from an outward lower portion of the outward protrusion portion 26*u* and protrudes outward at a middle portion, in the vertical direction, of the door outer panel 26.

As shown in FIGS. 9 and 12, the plural (seven, in the present embodiment) engagement protrusion pieces 26*a* are arranged substantially at regular intervals in the longitudinal direction at a lower face of the outward protrusion portion 26*u* at the upper portion of the door outer panel 26. Each of the plural engagement protrusion pieces 26*a* is formed in a rib shape such that it protrudes downward from the lower face of the outward protrusion portion 26*u* and extends in the vehicle width direction, and includes the engagement recess portion 26*b* which engages with the upper rib 23*f* (see FIG. 3) provided the beltline reinforcement outer 23. The engagement recess portion 26*b* is provided for the engagement protrusion pieces 26*a* such that the engagement recess portion 26*b* partitions the engagement protrusion pieces 26*a* extending in the vehicle width direction into an inside and an outside in the vehicle width direction (see FIG. 9).

Herein, as shown in FIG. 9, in a case in which a line which connects the plural engagement recess portion 26b formed at the plural engagement protrusion pieces 26a along a groove-forming direction is set as an imaginary engagement line L, at each of the plural engagement recess portions 26b is formed each of the engagement recess portions 26b so that the imaginary engagement line L becomes a straight line. In the present embodiment, the engagement recess portions 26b are formed at the engagement recess portions 26b so that the imaginary engagement line L becomes the straight line extending in the vehicle longitudinal direction. Herein, as shown in FIG. 9, a rib 26c which extends in the vehicle longitudinal direction and protrudes downward is formed at a lower face of the outward protrusion portion 26u, and respective inward ends, in the vehicle width direction, of the plural engagement protrusion pieces 26a which are arranged to be spaced apart from each other in the vehicle longitudinal direction are connected by the rib 26c, thereby reinforcing the engagement protrusion pieces 26a.

Further, as shown in FIG. 9, at a lower edge side 26h of the door outer panel 26 are arranged plural boss portions 26d, being spaced apart from each other in the longitudinal direction, substantially at regular intervals, and also at a front edge side 26i of the door outer panel 26 are arranged plural boss portions 26e, being spaced apart from each other in the vertical direction, substantially at regular intervals. As shown in FIGS. 9, 10A and 11B, the rear edge side 26j of the door outer panel 26 has a folding piece 26f made by hemming, which is capable of engaging with a rear edge piece 12h which protrudes rearward at the protrusion portion 12b of the rear-side vertical frame portion 12.

Attaching of the above-described door outer panel 26 to the door frame 10 is done as follows. First, the engagement recess portion 26b of the upper portion of the door outer panel 26 is made to engage with the above-described upper rib 23f of the beltline reinforcement outer 23 (see FIG. 12), so that the upper portion of the non-planar shaped door outer panel 26 can be made to fixedly engage with the beltline reinforcement outer 23 extending straightly in the longitudinal direction. Further, the folding piece 26f formed at the rear edge side 26j of the door outer panel 26 is made to engage with the rear edge piece 12h of the rear-side vertical frame portion 12 (see FIGS. 10A and 11B), the boss portions 26d of the lower edge side 26h of the door outer panel 26 are made to be fixedly attached to the attachment portions 14m (see FIG. 2) of the lower frame 14 by using an attaching member, such as a tapping screw B2 (wooden screw) as shown in FIG. 13, and, as shown in FIG. 11A, the boss portions 26e of the front edge side 26i of the door outer panel 26 are made to be fixedly attached to an attachment portion 11h which is formed at the protrusion portion 11b or the like at the front-side vertical frame portion 11 by using an attaching member, such as a tapping screw B3 (wooden screw), so that the door outer panel 26 can be attached to the door frame 10. In FIG. 13, reference character 14p denotes a service hole (work hole) which is provided to penetrate an inward face, in the vehicle width direction, of the lower frame 14 for conducting fastening work of the tapping screw B2.

<Structures of Window Regulator and Module Plate>

The window regulator 40 is a device to elevate or lower the door window glass 30 so that the door window glass 30 can get in or out of the door-window-glass insertion hole 70 (see FIG. 12) at the top end of the door body 1A, which comprises, as shown in FIGS. 2, 3, 7A, 7B, and 8, a pair of front-and-rear guide (two) rails 31, 32, a pair of front-and-rear carrier plates 33 which support the door window glass 30 and slide along the guide rails 31, 32, a connecting bracket 4 which slides together with the carrier plates 33, winding portions 34, 35, 36, 37 (see FIGS. 7A and 7B) which are provided at both upper-and-lower ends of the pair of guide rails 31, 32, a guide wire 38 which is provided in crossing around the winding portions 34, 35, 36, 37 so that a direction of the guide wire 38 can be changed, and an actuator 39 which drives the guide wire 38. The above-described window regulator 40 is attached to the door frame 10 and a resin-made module plate 41. The module plate 41 is arranged so as to cover the opening portion 10A formed at the central portion of the door frame 10 (see FIGS. 2, 5 and 6C) from the outward side, in the vehicle width direction, of the vehicle, and configured to contact an opening edge portion of the door frame 10 via a filling material 67 or the like from the outward side of the vehicle as shown in FIG. 13.

The module plate 41 includes, as shown in FIGS. 2, 7A and 7B, attachment portions 71a, 71b, 72a, 72b, 73a, 73b at respective upper ends, respective upper-side positions located below the respective upper ends, and respective lower-side positions of front-and rear sides thereof. The attachment portions 71a, 71b provided at the upper end, the attachment portions 72a, 72b provided at the upper-side positons, and the attachment portions 73, 73b provided at the lower-side positions are respectively positioned, being spaced apart from each other in the longitudinal direction, which corresponds to an arrangement gap of the pair of guide rails 31, 32. As shown in FIGS. 3 and 7A, the pair of guide rails 31, 32 are provided in parallel along an elevating/lowering direction of the door window glass, being spaced apart from each other in the longitudinal direction. The module plate 41 is, as described above, attached so as to cover the opening portion 10A of the door frame 10 from the outward side, and the pair of guide rails 31, 32 are attached to the module plate 41 from an outward side, in the vehicle width direction, of the module plate 41.

Specifically, as shown in FIGS. 7B and 8, attaching pieces 31a, 31b are provided to be spaced from each other in the vertical direction at an upper portion of a rear edge side of the front guide rail 31, and attaching pieces 32a, 32b are provided to be spaced from each other in the vertical direction at an upper portion of a front edge side of the rear guide rail 32. Likewise, as shown in FIGS. 7A and 8, attaching pieces 31c, 31c are provided to be spaced from each other in the vertical direction at a lower portion of the rear edge side of the front guide rail 31, and attaching pieces 32c, 32d are provided to be spaced from each other in the vertical direction at a lower portion of the front edge side of the rear guide rail 32. Herein, these attaching pieces 31a, 31b, 31c, 31d, 32a, 32b, 32c, 32d have attachment holes, respectively.

As shown in FIG. 7B, the attaching piece 31a of the front guide rail 31, the attachment portion 71a (see FIG. 2) of the module plate 41, and the attachment portion 13k (see FIG. 2) of the beltline reinforcement inner 13 are fastened together by using attaching members, such as bolts and nuts. Likewise, the attaching piece 32a of the rear guide rail 32, the attachment portion 71b of the module plate 41, and the attachment portion 13l of the beltline reinforcement inner 13 are fastened together by using the attaching members, such as bolts and nuts (see the same figures). As shown in FIGS. 7A and 7B, the attaching piece 31b of the front guide rail 31 and the attachment portion 72a (see FIG. 2) of the module plate 41 are fixedly attached by using the attaching members, and the attaching piece 32*b* of the rear guide rail 32 and the attachment portion 72*b* (see FIG. 2) of the module plate 41 are fixedly attached by using the attaching members. Likewise, as shown in FIG. 7A, the attaching piece 31*c* of the front guide rail 31 and the attachment portion 73*a* (see FIG. 2) of the module plate 41 are fixedly attached by using the attaching members, and the attaching piece 32*c* of the rear guide rail 32 and the attachment portion 73*b* (see FIG. 2) of the module plate 41 are fixedly attached by using the attaching members. Further, as shown in FIG. 7A, the attaching piece 31*d* of the front guide rail 31 and the attachment portion 14*k* (see FIG. 2) of the module plate 41 are fixedly attached by using the attaching members, and the attaching piece 32*d* of the rear guide rail 32 and the attachment portion 14*l* (see FIG. 2) of the lower arm 14 are fixedly attached by using the attaching members (see the same figure). Thus, the pair of guide rails 31, 32 are attached to the door frame 10 and the module plate 41 from the outward side of the vehicle.

Moreover, as shown in FIGS. 10A and 10B, the rear guide rail 32 comprises a rail portion 32*f* which extends in the longitudinal direction in the plan view, an inward wall portion 32*g* which extends from a front end of the rail portion 32*f* to the side of module plate 41 (to the inward side, in the vehicle direction, of the vehicle), an attaching piece 32*b* which extends forward from an inward end of the inward wall portion 32*g* along the module plate 41 so as to be attached to the module plate 41, an outward wall portion 32*i* which extends from a rear end of the rail portion 32*f* to the outward side, in the vehicle width direction, of the vehicle, and an engagement protrusion piece 32*j* which extends rearward from an outward end of the outward wall portion 32*i* and engages with a slider 54, which are formed integrally. As described above, the rear guide rail 32 is provided with the attaching pieces 32*a*, 32*c* in addition to the attaching piece 32*b*, and also with the attaching piece 32*d* which extends forward along the lower frame 14 so as to engage with the lower frame 14. Further, the front guide rail 31 is symmetrical, in the plan view, to the rear guide rail 32. Therefore, its detailed description is omitted.

As shown in FIGS. 7B and 8, the connecting bracket 47 is equipped with wire engagement portions 47*c*, 47*d* which engage with the closing guide wire 38 at its front-and-rear both sides, and also equipped with a connection portion 47*e* which connects the pair of front-and-rear wire engagement portions 47*c*, 47*d* between the pair of wire engagement portions 47*c*, 47*d*. The pair of wire engagement portions 47*c*, 47*d* and the connection portion 47*e* integrally form together a sheet of longitudinally-long panel. As shown in FIGS. 7B and 10B, clamp portions 47*a*, 47*b* (caulking pieces) to caulk the guide wire 38 are provided at tip portions of the wire engagement portions 47*c*, 47*d*, that is—at a front end portion of the front-side wire engagement portion 47*c* and a rear end portion of the rear-side wire engagement portion 47*d*, and an upper portion of the guide wire 38 extending along the front-and-rear guide rail 31, 32 are caulked by the clamp portions 47*a*, 47*b*. As shown in FIGS. 2, 7A and 7B, a glass temporary-support portion 57 which is swingable around an axis extending in the vehicle width direction with a support point of a pivotal portion 56 is provided at a middle position, in the longitudinal direction, of the connection portion 47*e*. A recess portion where a lower end of the door window glass 30 is arranged is integrally formed at an upper portion of the glass temporary-support portion 57.

As shown in FIG. 7B, a long hole 47*f* which is configured to extend vertically long so as to allow the door window glass 30 to swing is formed at a position of the connecting bracket 47 which is located (at a boundary position) between the wire engagement portion 47*c* or 47*d* and the connection portion 47*e*, which corresponds to a fixation portion of the connecting bracket 47 (wire engagement portion 47*c* or 47*d*) to the carrier plate 33. A pin bolt 74 which is integrally fixed to the door window glass 30 and the carrier plate 33, which will be described later, is inserted into this long hole 47*f* (see FIGS. 7B, 8 and 10C), and the long hole 47*f* has a specified gap (width) and a specified length which can allow the pin bolt 74 to slide therein according to a swing of the door window glass 30 (see FIG. 10C).

As shown in FIGS. 2, 7A, 7B, 8, 11A and 11B, the carrier plates 33 support the door window glass 30 at an outer face and both-side lower sides of the door window glass 30. The front-side carrier plate 33 is attached to the door window glass 30 at two points of a front upper portion and a rear lower portion thereof, and the rear-side carrier plate 33 is attached to the door window glass 30 at two points of a rear upper portion and a front lower portion thereof. An attachment structure of the front upper portion of the front-side carrier plate 33 and the door window glass 30 is similar to an attachment structure of the rear upper portion of the rear-side carrier plate 33 and the door window glass 30, and each of the carrier plates 33 and the door window glass 30 are fixedly fastened together by a pair of inner-and-outer bushes 42, a pair of inner-and-outer retainers 43, and a support member 46 comprising a bolt 44 and a nut 45 as shown in FIGS. 11A and 11B.

Meanwhile, an attachment structure of the rear lower portion of the front-side carrier plate 33 and the door window glass 30 is similar to an attachment structure of the front lower portion of the rear-side carrier plate 33 and the door window glass 30, and, as shown in FIG. 10C, a fixation portion 76 of the door window glass 30 and the carrier plate 33 and a fixation portion 77 of the connecting bracket 47 and the carrier plate 33 are connected coaxially, and three of the carrier plate 33, the door window glass 30, and the connecting bracket 47 are fixedly fastened together by a support member 75. That is, at each of the rear lower portion of the front-side carrier plate 33 and the front lower portion of the rear-side carrier plate 33 are fixedly fastened together the above-described three members 30, 33, 47 by the support member 75 which is composed of the pair of inner-and-outer bushes 42, the pair of inner-and-outer retainers 43, the pin bolt 74 forming a screw at its tip, and the nut 45. Herein, since the bush 42, the retainer 43, and the nut 45 of the support member 75 have similar structures to the above-described support member 46 (see FIGS. 11A and 11B), the same reference characters are used and their descriptions are omitted here.

In a state of the support member 75 in which the nut 45 is not fastened to the pin bolt 74 yet, the pin bolt 74 inserted into the long hole 47*f* is positioned at a middle position, in a longitudinal direction (hole forming direction), of the long hole 47*f* (see FIGS. 7B and 8), and the pin bolt 74 is capable of sliding along the long hole 47*f* when the door window glass 30 and the carrier plate 33 swing with the support point of the pivotal portion 56. Further, in a state in which the nut 45 is fastened to the pin bolt 74, the pin bolt 74 inserted into the long hole 47*f* is not capable of sliding, thereby prohibiting the swing of the door window glass 30. Moreover, in the state in which the nut 45 is fastened to the pin bolt 74, the front-and-rear carrier plates 33, 33 are interconnected as a unit by the connection portion 47*e* of the connecting bracket 47.

As shown in FIGS. 2, 7A and 7B, the guide wire 38 comprises an outer tube 38a and an inner wire 38b, and the inner wire 38b is clamped by the clamp portions 47a, 47b provided at the longitudinally-both ends of the connecting bracket 47 (see FIG. 7B). Further, the above-described actuator 39 comprises a motor 49 which installs an electric-current sensor which detects an upper-limit position, a lower-limit position, and jamming of the door window glass 30 when an electric current exceeds a threshold. As shown in FIGS. 7A and 7B, a release-side winding portion for the elevation of the door window glass 30 among the above-described winding portions 34, 35, 36 and 37, that is—the winding portion 35 provided at the lower end portion of the front-side guide rail 31 (see FIG. 7A) is configured to be a guide portion 50 which protrudes downward in a fan shape, and the other all winding portions 34, 36, and 37 than the fan-shaped guide portion 50 are configured to be pulleys 51.

Figure 14:
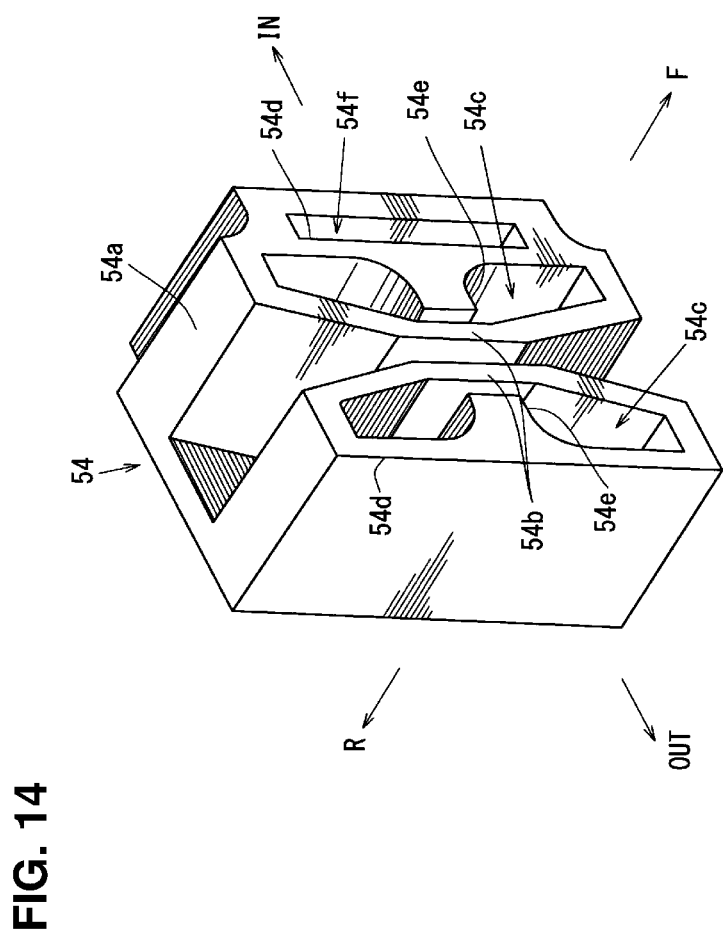
FIG. 14 is a perspective view of a slider.

FIG. 14 is a perspective view of a slider, FIG. 15A is an exploded view of a pressing member, a receiving member, and a door-beltline constituting member (beltline reinforcement inner), FIG. 15B is a sectional view taken along line F-F of FIG. 15A, FIG. 15C is an explanatory diagram showing an attachment structure of the fan-shaped guide member 50 and a down stopper 52, and FIG. 15D is an explanatory diagram of the receiving member.

As shown in FIGS. 7A and 15C, the down stopper 52 to limit a lowering position of the door window glass 30 is provided at an upper portion of the fan-shaped guide portion 50. This down stopper 52 is made of a resilient material, such as rubber or elastomer. A move of the guide wire 38 in a case of the door window glass 30 being elevated is shown by an arrow in FIG. 7A. Herein, while the winding portions 35, 37 provided at respective lower end portions of the front-and-rear guide rails 31, 32 become release-side ones, the winding portion 35 provided at the lower end portion of the front-side guide rail 31 is configured to be the fan-shaped guide portion 50 protruding downward in the present embodiment.

By configuring the release-side winding portion 35 in the case of the door window glass 30 being elevated as the fan-shaped guide portion 50 and providing the down stopper 52 at the upper portion of this fan-shaped guide portion 50 as shown in FIG. 15C, the down stopper 52 is arranged compactly by using the winding portion 35. Thereby, the elevating performance of the door window glass 30 in a normal state and the compactness are compatibly attained, and also the strength for lowering limiting of the door window glass 30 is secured.

<Support Structure of Slider>

As shown in FIGS. 7A, 7B, 8, 10, 11A and 11B, sliders 53, 54 to slide along the guide rails 31, 32 are provided at the carrier plates 33. A structure of the slider 53 sliding along the front-side guide rail 31 and its support structure and a structure of the slider 54 sliding along the rear-side guide rail 32 and its support structure are symmetrical in the plan view, so the rear-side slider 54 and its support structure will be described here.

As shown in FIG. 14, the slider 54 comprises a block-shaped slider body 54a, a pair of inner-and-outer resilient slide portions 54b, 54b which extend in the vertical direction and slide along a guide rail 32 formed at a central portion, in the vehicle width direction, of the slider body 54a, space portions 54c, 54c which are formed on the inward side and on the outward side of the pair of resilient slide portions 54b, 54b, stopper portions 54e, 54e which extend toward the resilient slide portions 54b, 54b from middle portions, in the vertical direction, of vertical walls 54d, 54d which form the space portions 54c, 54c, and an engagement hole 54f which is formed on the inward side, in the vehicle width direction, of the slider body 54a and an attaching piece 33a (see FIGS. 11A and 11B) formed at the carrier plate 33 engages with, which are formed integrally. The slider 54 is configured, as shown in FIGS. 10, 11A and 11B, such that the attaching piece 33a engages with the engagement hole 54f and a rear edge portion of the guide rail 32 is interposed between the pair of resilient slide portions 54b, 54b so as to slide therein. In the present embodiment, the sliders 53, 54 and the sliders 54, 54 are provided for the both carrier plates 33, 33 to spaced apart from each other in the vertical direction, respectively. As shown in FIG. 7B, the front-side slider 53 is made to engage with the front-side rail 31 from the front outward side, and the rear-side slider 54 is made to engage with the rear-side guide rail 32 from the rear outward side. By making the sliders 53, 54 engage with the guide rails 31, 31 from the longitudinal outward side as described above, the door window glass 30 is positioned in the longitudinal direction securely and also the down stopper 52 (see FIGS. 7A and 15C) is arranged compactly on the inward side (i.e., on the rear side in the longitudinal direction) of the slider 54 engaging with the front-side guide rail 31.

As shown in FIG. 15C, an attaching piece 55 to attach both of the down stopper 52 and the fan-shaped guide portion 50 vertically is formed integrally at the lower end portion of the front-side guide rail 31 by means of erecting. And, the down stopper 52 is attached to an upper portion of the attaching piece 55, and the fan-shaped guide portion 50 is attached to a lower portion of the attaching piece 55. Herein, a recess groove portion 50a to guide the guide wire 38 is formed at a peripheral face of the fan-shaped guide portion 50. By integrally forming the attaching piece 55 to attach the down stopper 52 and the fan-shaped guide portion 50 with the guide rail 3, an increase of the parts number is suppressed.

<Positioning of Door Window Glass Using Glass Temporary Support Portion>

Meanwhile, while the glass temporary-support portion 57 which temporarily supports the door window glass 30 so that the door window glass 30 can swing with the support point of the pivotal portion 56 is provided at the middle position, in the longitudinal direction, of the connecting bracket 47 as shown in FIGS. 7A and 7B, the positioning of the door window glass 30, i.e., the carrier plates 33, by using the glass temporary-support portion 57 will be described.

A lower end of the door window glass 30 is arranged in a recess portion of the glass temporary support portion 57, and the pin bolt 74 is made to freely slide in the long hole 47f by unfastening the nut 45 of the support member 75 (see FIG. 10C), thereby allowing the swing of the door window glass 30. In this state, the window regulator 40 is driven, the upper end of the door window glass 30 is made to contact a body-side roof side rail portion 102 and a front pillar portion 103 (see FIG. 1), and the door window glass 30 is positioned via the glass temporary support portion 57 swinging with the support point of the pivotal portion 56. Then, the nut 45 is fastened to the pin bolt 74 of the support member 75. Thereby, the door window glass 30 can be easily poisoned and fixed at an appropriate position when the door window glass 30 is shut off. That is, the side door 1 of the present embodiment is configured such that the door window glass 30 is temporally supported by the support member 75 provided at the middle portion, in the longitudinal direction, of the connecting bracket 47 with the support point of the pivotal portion 56, and the door window glass 30 and the carrier plate 33 are easily positioned to an appropriate position from a position which is influenced by slackening of the guide wire 38 or the like. This structure is particularly effective to a sashless type of side door in which the door window glass 30 is supported by the guide rails 31, 32 and the like from the longitudinal both sides, having a high rigidity, like the side door 1 of the present embodiment.

<UP Stopper and its Surrounding Structure>

Next, an up stopper to limit the upper-limit position of the door window glass 30 and its surrounding structure will be described referring to FIGS. 12, 15A, 15b and 15D. As shown in FIG. 12, an up stopper 60 comprises a pressing member 62, as a lower-side member of the glass side, which is fixed to the carrier plate 33 by a screw 61 and a receiving member 64, as the upper-side member of the door side, which is adjustably attached to the belt line reinforcement inner 13 so as to move in the longitudinal direction by using the bolt 63.

While either one of the lower-side member (the pressing member 62) and the upper-side member (the receiving member 64) has a concave portion and the other has a recess (concave) portion, a convex portion 62a which has a wedge shape (specifically, a trapezoidal shape having a vertically long size) is formed at the pressing member 62 as the lower-side member and a recess portion 64a which has a shape corresponding to the above-described wedge shape is formed at the receiving member 64 as the upper-side member in the present embodiment. As shown in FIGS. 15B and 15D, contact faces 64b, 64c which slant in the vertical direction in the side view are formed at the receiving member 64 as shown in FIGS. 15B and 15D. As shown in these figures, the above-described contact faces 64b, 64c of the present embodiment slant outward and outward in the vehicle width direction such that their front portions are relatively close to the beltline reinforcement inner 13 and their rear portions are relatively far way from the beltline reinforcement inner 13. Further, as shown in FIGS. 12, 15A, 15B and 15D, the above-described receiving member 64 is configured to slide horizontally (i.e., in the vehicle longitudinal direction) relative to ribs (specifically, an upward facing rib 13a and a lateral rib 13b) of the beltline reinforcement inner 13 as a door beltline forming member.

Thereby, by merely making the receiving member 64 as the upper-side member slide horizontally relative to the ribs 13a, 13b of the beltline reinforcement inner 13, the positioning, in the vertical direction, of the door window glass 30 can be attained, thereby facilitating the positioning. Further, by making the receiving member 64 with the pressing member 62, the upper-limit position of the door window glass 30 can be limited so that the upper-limit position and the above-described vertical-direction position become appropriate, thereby securing the performance of suction prevention of the door window glass 30. That is, the upper-limit position of the door window glass 30 can be limited by the up stopper 60, so that it can be prevented that the door window glass 30 is elevated excessively. Also, since the positioning, in the vertical direction, of the door window glass 30 can be attained, the vibration prevention of the door window glass 30 during a normal traveling state and the suction prevention of the door window glass 30 which is caused by a negative pressure generated during a high-speed traveling state can be compatibly attained.

In this connection, while another member than the up stopper is provided for the vertical-direction positioning of the door window glass in a conventional structure, the upper-limit position's limiting and the vertical-direction positioning of the door window glass 30 can be attained by the up stopper 60 in the present embodiment. The contact face 64b is formed at a portion of the above-described receiving member 64 which is positioned along a glass face 13c of the beltline reinforcement inner 13, and this contact face 64b slants obliquely upward and toward the door window glass 30. Thereby, when the upper-limit position of the door window glass 30 is limited, a positioning load in a state in which the convex portion 62a of the pressing member 62 is inserted into the recess portion 64a of the receiving member 64 is received by the above-described beltline reinforcement inner 13, thereby supporting the door window glass 30 firmly.

The above-described beltline reinforcement inner 13, which is made of the extrusion molding of the light metal or the light metal alloy described above, comprises the hollow portion 13s (closed cross section), four sides enclosing the hollow portion 13s which comprises an upper piece 13e, a lower piece 13f, an outer piece 13g, and an inner piece 13h, the above-described lateral rib 13b which protrudes toward the glass side on an extensional line of the upper piece 13e, the above-described upward facing rib 13a which protrudes upward on an extensional line of the outer piece 13g, and the above-described downward-extending rib 13i which extends downward from the vicinity of a connecting corner portion of the outer piece 13g and the lower piece 13f, which are formed integrally.

As shown in FIG. 15A, the above-described receiving member 64 has an engagement recess portion 64d with which the above-described lateral rib 13b engages and a groove portion 64e into which the above-described upward facing rib 13a is inserted, additionally to the recess portion 64a. That is, the door-side receiving member 64 is configured to have a cross section which engages with the above-described respective ribs 13a, 13b. Further, the receiving member 64 has a fastening portion 64f which is formed on an opposite side to the door window glass 30 of the upper facing rib 13a, i.e., on the inward side, in the vehicle width direction, of the vehicle, and this fastening portion 64f (see the bolt 63, particularly) is configured to be openable from a cabin side when the side door is closed, thereby facilitating positioning work of the door window glass 30.

Further, the above-described sashless type of side door 1 comprises the door frame 10 which comprises the inward frames 11, 12, 13, 14 (the front-side vertical frame portion 11, the rear-side vertical frame portion 12, the beltline reinforcement inner 13, and the lower frame 14) and the outward connecting frames 23, 24 (the beltline reinforcement outer 23 and the impact bar 24), the module plate 41 which supports the door window glass 30 so that it can be elevated or lowered, and the window regulator 40 which includes the two guide rails 31, 32 (see FIGS. 2 and 3). The two guide rails 31, 32 are fixed to the module plate 41, respectively (see FIGS. 3 and 7A). The module plate 41 is fixed to an edge of the opening portion 10A provided at the inward frames 11, 12, 13, 14 and the two guide rails 31, 32 are fixed (see FIGS. 3, 7A and 13).

Moreover, the attachment portions 23h, 23i and the boss portions 15, 19 which are capable of afterward attaching the beltline reinforcement outer 23 to the vertical frame portions 11, 12 are respectively provided at the beltline reinforcement outer 23 and the vertical frame portions 11, 12, and the attachment portions 24h, 24i and the boss portions 16, 20 which are capable of afterward attaching the impact bar 24 to the vertical frame portions 11, 12 are respectively provided at the impact bar 24 and the vertical frame portions 11, 12 (see FIGS. 2-6A, 6B and 7A). Also, the boss portion 26e and the attachment portion 11h which are capable of afterward attaching the door outer panel 26 to the door frame 10 are respectively provided at the front edge side 26*i* of the door outer panel 26 and the front-side vertical wall portion 11 of the door frame 10 (see FIGS. 9 and 11A), and the boss portion 26*d* and the attachment portion 14*m* which are capable of afterward attaching the door outer panel 26 to the door frame 10 are respectively provided at the lower edge side 26*h* of the door outer panel 26 and the lower frame 14 of the door frame 10 (see FIGS. 9 and 13).

According this structure, the window regulator 40 which is provided with the module plate 41 and the guide rails 31, 32 and the door outer panel 26 can be attached to the inward frames 11, 12, 13, 14 from the outward side in this order. That is, since the window regulator 40 can be attached before the door outer panel 26 is attached to the inward frames 11, 12, 13, 14, the window regulator 40 and the module plate 41 can be easily attached to the inward frames 11, 12, 13, 14 (specifically the beltline reinforcement inner 13 and the lower frame 14) despite these members 40, 41 being large sized. Further, the two guide rails 31, 32 are fixed to the module plate 41 at their upper-and-lower side positions. That is, the attaching pieces 31*a*, 32*a* provided at the upper-upper sides of the guide rails 31, 32, the attachment portions 71*a*, 71*b* (see FIG. 2) of the module plate 41, and the attachment portions 13*k*, 13*l* (see FIG. 2) of the beltline reinforcement inner 13 are fastened together (see FIG. 7B), and the attaching pieces 31*c*, 32*c* provided at the lower-upper sides of the guide rails 31, 32 and the attaching portions 73*a*, 73*b* (see FIG. 2) of the module plate 41 are fixedly attached (see FIG. 7A). Thereby, the module plate 41 and the guide rails 31, 32 are formed integrally so as to reinforce each other, thereby providing the high rigidity. The large-sized window regulator 40 can be provided by strengthening the module plate 41 and the guide rails 31, 32 as described above. Further, since the door window glass 30 can be supported by the large-sized window regulator 40, the glass support rigidity can be improved consequently.

Herein, the type of door in which the widow regulator is inserted through the window-glass insertion groove, as the door-window-glass insertion groove hole 70 (see FIG. 12) provided at the upper portion of the door body, and then assembled to the inner panel from the outward side in the vehicle width direction has been proposed as disclosed in the above-described second patent document (Japanese Patent Laid-Open Publication No. S61-146990). However, in general, if the window-glass insertion groove is configured to have its width which is wide enough to at least allow the elevation/lowering device to pass through it, there is a concern that the sufficient rigidity of the door-body upper portion may become difficult to secure because the frame member extending in the longitudinal direction which is provided at the door-body upper portion is required to be made narrow or the like for the design property or the functionality. By contrast, according to the door structure of the present embodiment, the door-window-glass insertion groove hole 70 provided at the upper portion of the door body 1A does not need to be configured to have the wide width enough to allow the window regulator 40 to be inserted therein, so that the cross section between the inward connecting frames 13, 14 and the outward frames 23, 24 can be made properly large, thereby increasing the glass-support rigidity of the door frame 10 further.

Specifically, the module plate 41 is tightly fixed to the edge of the opening portion 10A provided at the center of the inward frames 11, 12, 13, 14 from the outward side (see FIGS. 3, 7A and 13). Further, the attachment portions 23*h*, 23*i*, 24*h*, 24*i* and the boss portions 15, 19, 16, 20 which are capable of afterward attaching the outward connecting frames 23, 24 to the vertical frame portions 11, 12 among the inward frames 11, 12, 13, 14 are provided at these members 11, 12, 13, 14 (see FIG. 4), and also the door outer panel 26 is provided at the door frame 10 so as to be attached later than an attachment timing of the module plate 41 (see FIGS. 9 and 12). Accordingly, even if the module plate 41 becomes a large-sized one having a vertically long or the like, this module plate 41 can be easily attached to the inward connecting frames 13, 14.

That is, according to the door structure of the present embodiment, even if the inward connecting frames 13, 14 are provided to be spaced apart from each other in the vertical direction having a large gap between them so as to form the opening portion 10A, the module plate 41 can be attached to these frames 13, 14 as well. Therefore, compared with the conventional structure in which the window regulator is attached to the door frame later than the attachment timing of the door outer panel or the window regulator being inserted through the opening portion provided at the inward frames and attached from the inward side of the vehicle, the door structure of the present embodiment can arrange the inward connecting frames 13, 14 in the vertical direction, having as an large gap between them as possible, so that the bending rigidity of the cross sections of the inward frames 11, 12, 13, 14 (the cross section secondary moment around a longitudinal axis) can be increased.

Herein, since the inward frames 11, 12, 13, 14 are configured such that the opening portion 10A is formed at the center by the vertical frame portions 11, 12 provided at the front-and-rear sides and the inward connecting frames 13, 14 provided at the upper-and-lower sides, there is a problem that while the inward connecting frames 13, 14 having the larger vertical gap can increase the bending rigidity as described above, the size of the opening portion 10A becomes so wide that improper deformation of a parallelogram shape (a rhombic shape) may be caused easily. By contrast, the module plate 41 and the guide rails 31, 32 are mutually reinforced so as to provide the high rigidity and attached to the inward connecting frames 13, 14 arranged vertically as described above. Particularly, since the upper-upper side attaching pieces 31*a*, 32*a* of the guide rails 31, 32, the attachment portions 71*a*, 71*b* (see FIG. 2) of the module plate 41, and the attachment portions 13*k*, 13*l* (see FIG. 2) of the beltline reinforcement inner 13 are fastened together (see FIG. 7B), the rigidity can be secured so as not to cause the above-described improper deformation of the parallelogram shape (the rhombic shape).

That is, it can be prevented that some water comes in between the door window glass 30 and the weather strip 78 attached to the door-window-glass insertion hole 70 provided at the upper portion of the door body 1A (see FIG. 12). Moreover, since the module plate 41 is attached tightly to the edge of the opening portion 10A provided at the inward frames 11, 12, 13, 14 from the outward side of the vehicle, even if water W comes into the internal space of the door body 1A through a space between the weather strip 78 and the door window glass 30 at the door-window-glass insertion hole 70 provided at the upper portion of the door body 1A as shown in FIG. 13, the water W does not come in toward the inside of the door body 1A (the cabin) through the gap between the module plate 41 and the lower frame 14 nor stay in the gap, and also the water W can be drained to the outside of the door body 1A along an outer face of the lower frame from an outer face of the module plate 41, which is preferable from perspectives of water stopping.

In the embodiment of the present invention, the beltline reinforcement outer 23 of the outward connecting frames 23, 24 is provided along the upper portion of the sashless door body 1A, and the attachment portion (the upper rib 230 capable of attaching the door outer panel 26 is provided at the beltline reinforcement outer 23 provided along the upper portion of the sashless door body 1A (see FIG. 23). According to this embodiment, making the large-sized module plate large-sized and the door rigidity can be compatibly attained more effectively.

Further, in the embodiment of the present invention, as shown in FIG. 10B, the rear-side guide rail 32 comprises the rail portion 32f which extends vertically in the vehicle front view, curving, the inward wall portion 32g which extends from the rail portion 32f to the module plate 41, and the attaching pieces 32a, 32b, 32c which extend from the inward end of the inward wall portion 32g along the module plate 41 so as to be attached to the module plate 41 (see FIGS. 2, 7A, 7B and 8). The rear-side guide rail 32 further comprises the attaching piece 32d which extends forward along the lower frame 14 so as to be attached to the lower frame 14 (see the same figure). Herein, the front-side guide rail 31 is symmetrical to the rear-side guide rail 32 in the plan view and configured to have the similar structure to the rear-side guide rail 32. According to the above-described structure, the formability (dimensional accuracy) of the guide rails 31, 32 and the glass support rigidity can be improved.

Specifically, in general, the front pillar 103 (see FIG. 1) slants such that its upper portion is positioned inward relative to its lower portion in the vehicle front view (the elevational view), not illustrated, from viewpoints of reduction of the influence of lateral wind or the vehicle-body rigidity, and also the roof side rail 102 (see the same figure) is configured to be arranged at an inward-side position relative to the door body 1A. Therefore, the door window glass 30 is configured to slant in such a manner that when it is moved up to its elevated position, it contacts the roof side rail 102 and the front pillar 103, and also to extend vertically roughly straightly in such a manner that when it is moved down to its lowered position, it is stored inside the door body 1A. In accordance with this, the guide rails 31, 32 are configured in the curved shape such that their upper-side portions are positioned on the inward side, in the vehicle width direction, from their lower-side portions in the vehicle front view, which corresponds to a vertical-move locus of the window glass 30 in the vehicle front view (the sectional view). Further, since the sashless type of door generally requires the glass support rigidity more than the sash type of door, a window regulator to reinforce a member, such as the guide rail to guide the door window glass, is used widely, for example.

Meanwhile, a conventional guide rail is configured as disclosed by Japanese Patent Laid-Open Publication No. H10-037592 such that guide grooves (24, 30) capable of engaging with sliders (26, 32) are provided to extend in a longitudinal direction, there are provided bridges (74, 76) as a bracket to be fixed to a base (12), and this guide rail is fixed integrally to the base (12) via the bridges (74, 76). The conventional guide rail is generally configured such that the guide grooves (24, 30) have a U-shaped (C-shaped) cross section. The conventional guide rail described above has merits that the rigidity can be easily secured, the sliders can be made to engage firmly, and the dimensional error of the guide rail itself can be easily absorbed by having its engagement with the sliders loose. However, since the guide rail is generally configured in the curved shape in the vehicle front view as described above and also configured to have a wide cross section for reinforcement in order to secure the glass support rigidity corresponding to the sashless type of door, the above-described conventional guide rail has a demerit that it may be difficult to form it cross section in the U shape (C shape), securing the necessary accuracy which is required as the guide rail.

By contrast, the guide rail 32 of the present embodiment comprises the rail portion 32f, the inward wall portion 32g, and the attaching pieces 32a, 32b, 32c, 32d (see FIGS. 7A, 7B, 8 and 10B). According to this structure, since the rail portion 32f is configured in a straight-line shape in the plan view, unlike the conventional guide rails having the U-shaped cross section (see FIG. 10B), the guide rail can be formed so as to provide the sufficient dimensional accuracy. Moreover, by forming the rail portion 32f in a simple shape so as to easily secure the sufficient dimensional accuracy which is required as the guide rail 32, the guide rail 32 of the present embodiment does not need to be formed by being attached to any other member for securing the dimensional accuracy of the guide rail like the conventional guide rail and bridge (bracket), so that the rail portion 32f, the inward wall portion 32g, and the attaching pieces 32a, 32b, 32c, 32d can be formed integrally. That is, the guide rail of the present embodiment can be made of a single member by the forming or the like, so that the parts number or the assembly steps can be reduced and also its assemblability to the module plate 41 can be improved. Also, since the guide rail 23 of the present embodiment can be formed in a so-called open-type shape by the rail portion 32f, the inward wall portion 32g, and the attaching pieces 32a, 32b, 32c, 32d like the conventional guide rail having the U-shaped cross section (see FIG. 10B), the formability (workability) can be improved. Additionally, since the guide rail 32 of the present embodiment comprises the inward wall portion 32g and the outward wall portion 32i which extend in the width direction (see FIG. 10B), the rigidity, in the width direction, of the guide rail 32 can be secured, and by integrally fixing the present guide rail 32 to the facial-shaped module plate 41 extending in the vertical direction and the longitudinal direction, the width-directional rigidity of the module plate 41, particularly, can be increased as well. Herein, since the front-side guide rail 31 is symmetrical to the rear-side guide rail 32 in the plan view as described above, the front-side guide rail 31 can provide the same effects as the guide rail 32, of course.

In the embodiment of the present invention, as shown in FIGS. 2-6C and 7A, the inward frames 11, 12, 13, 14 comprise the front-and-rear vertical wall portions 11, 12 made of the aluminum casting and the inward connecting frames 13, 14 made of the extrusion molding provided between the vertical frame portions 11, 12. According to this structure, since the inward frames 11, 12, 13, 14 are configured in the frame shape such that the opening portion 10A is formed at the central portion by the front-and-rear vertical frame portions 11, 12 and the upper-and-lower inward connecting frames 13, 14, and the vertical frame portions 11, 12 and the inward connecting frames 13, 14 are made of the aluminum or aluminum alloy, the side door 1 can be made to have light weight and high rigidity as a whole.

Herein, while in the case in which the opening portion 10A is formed at the center like the inward frames 11, 12, 13, 14 as described above, there is a concern that the improper deformation of the parallelogram shape may be caused as described above, since the module plate 41 is tightly fixed to the edge of the opening portion 10A from the outward side of the vehicle and the two guide rails 31, 32 are fixed as described above, the inward frames 11, 12, 13, 14 can be reinforced by the module plate 41 and the two guide rails 31, 32 so as not to cause the above-described deformation of the parallelogram shape. Accordingly, since even the slight (small) deformation of the parallelogram shape of the inward frames 11, 12, 13, 14 can be prevented by the front-and-rear vertical frame portions 11, 12 and the upper-and-lower inward connecting frames 13, 14, the light-weight and high-rigidity structure and the water-stopping performance of the side door 1 as a whole can be combatively attained, and in particular, the sufficient glass support rigidity required to the sashless type of side door 1 can be secured.

The door window of the present invention corresponds to the door window glass 30 of the present embodiment. Likewise, the attachment portion capable of attaching the outward frame to the inward frame corresponds to the attachment portions 23h, 23i, 24h, 24i and the boss portions 15, 16, 19, 20, and the attachment portion capable of attaching the door outer panel to the outward frame corresponds to the attachment portions 11h, 14m and the boss portions 26d, 26e. In claim 2, the attachment portion capable of attaching the door outer panel to the outward frame corresponds to the upper rib 23f. In claim 3, the wall portion corresponds to the inward wall portion 32g, and the attachment portion corresponds to the attachment pieces 31a, 31b, 31c, 32a, 32b, 32c. The outward frame corresponds to the outward connecting frames 23, 24. In claim 4, the connecting member corresponds to the inward connecting frames 13, 14 (the beltline reinforcement inner 13 and the lower frame 14). However, the present invention is not to be limited to the above-described embodiment.

For example, the material of the door outer panel is not limited to resin, which is used in the present embodiment, but any light-metal material, such as aluminum or aluminum alloy, or any other material may be used. The door structure of the present invention is applicable not only to the side door 1 like the present embodiment but to any rear door, and also may be applied to a door provided with a sash, not being limited to the sashless type of door.

What is claimed is:

1. A door structure of an automotive vehicle, which is provided with a sashless door body comprising an inward frame and an outward frame, a window regulator provided with a guide rail to guide a door window so as to elevate or lower the door window, a module plate attached to the inward frame, and a door outer panel, wherein said inward frame comprises a pair of vertical frame portions which are made of light-metal casting and provided at a front side and a rear side, and an upper connecting member and a lower connecting member which are made of light-metal extrusion molding and provided at an upper side and a lower side between said vertical frame portions, which are configured in a frame shape, said guide rail comprises a pair of front-and-rear guide rails which are provided to extend along an elevating/lowering direction of the door window and be spaced apart from each other in a longitudinal direction, said pair of front-and-rear guide rails are fixed to said module plate from an outward side in a vehicle width direction, and said module plate is fixed to an edge of an opening portion provided at said inward frame from the outward side in the vehicle width direction so as to cover the opening portion, said pair of front-and-rear guide rails are fixed to respective points of said upper connecting member and said lower connecting member which correspond to the pair of front-and-rear guide rails from the outward side in the vehicle width direction, and an attachment portion capable of attaching said outward frame to said inward frame is provided, and another attachment portion capable of attaching said door outer panel to said outward frame attached to the inward frame is provided.

2. The door structure of the automotive vehicle of claim 1, wherein said attachment portion attaching the outward frame to the inward frame is capable of attaching the outward frame to the inward frame later than an attachment timing of said guide rail and said module plate, said outward frame is provided at least along an upper portion of said sashless door body, and said attachment portion capable of attaching the door outer panel is provided at the outward frame provided along the upper portion of the sashless door body.

3. The door structure of the automotive vehicle of claim 1, wherein said guide rail comprises a rail portion which extends vertically and curves such that an upper side thereof is positioned inward, in the vehicle width direction, relative to a lower side thereof in a vehicle front view, a wall portion which extends toward said module plate from said rail portion, and an attachment portion which extends from an end of said wall portion which is positioned on the side of the module plate so as to be attached to the module plate.

4. The door structure of the automotive vehicle of claim 2, wherein said guide rail comprises a rail portion which extends vertically and curves such that an upper side thereof is positioned inward, in the vehicle width direction, relative to a lower side thereof in a vehicle front view, a wall portion which extends toward said module plate from said rail portion, and an attachment portion which extends from an end of said wall portion which is positioned on the side of the module plate so as to be attached to the module plate.

5. An assembly method of a door structure of an automotive vehicle, which is provided with a sashless door body comprising an inward frame and an outward frame, a window regulator provided with a guide rail to guide a door window so as to elevate or lower the door window, a module plate attached to the inward frame, and a door outer panel, wherein said inward frame comprises a pair of vertical frame portions which are made of light-metal casting and provided at a front side and a rear side, and an upper connecting member and a lower connecting member which are made of light-metal extrusion molding and provided at an upper side and a lower side between said vertical frame portions, which are configured in a frame shape, said guide rail comprises a pair of front-and-rear guide rails which are provided to extend along an elevating/lowering direction of the door window and be spaced apart from each other in a longitudinal direction, the assembly method comprising steps of:

fixing said guide rail pair of front-and-rear guide rails to said module plate from an outward side in a vehicle width direction;

fixing said module plate to an edge of an opening portion provided at said inward frame from the outward side in the vehicle width direction so as to cover the opening portion;

wherein said pair of front-and-rear guide rails are fixed to respective points of said upper connecting member and said lower connecting member which correspond to the pair of front-and-rear guide rails from the outward side in the vehicle width direction, attaching said outward frame to said inward frame; and attaching said door outer panel to said outward frame.

* * * * *